US011029052B2

(12) United States Patent
Ota et al.

(10) Patent No.: US 11,029,052 B2
(45) Date of Patent: Jun. 8, 2021

(54) OPERATION DEVICE AND METHOD TO CONTROL AN AIR CONDITIONER BASED ON WEATHER CHANGE PATTERNS

(71) Applicant: Mitsubishi Electric Corporation, Tokyo (JP)

(72) Inventors: Yoshihiro Ota, Tokyo (JP); Tomooki Ukiana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/613,735

(22) PCT Filed: Jul. 5, 2017

(86) PCT No.: PCT/JP2017/024649
§ 371 (c)(1),
(2) Date: Nov. 14, 2019

(87) PCT Pub. No.: WO2019/008698
PCT Pub. Date: Jan. 10, 2019

(65) Prior Publication Data
US 2020/0124308 A1    Apr. 23, 2020

(51) Int. Cl.
*F24F 11/47*    (2018.01)
*F24F 11/80*    (2018.01)
(Continued)

(52) U.S. Cl.
CPC .............. *F24F 11/47* (2018.01); *F24F 11/56* (2018.01); *F24F 11/64* (2018.01); *F24F 11/65* (2018.01);
(Continued)

(58) Field of Classification Search
CPC .................. F24F 11/47; F24F 2130/10; G05B 2219/2614
See application file for complete search history.

(56) References Cited

U.S. PATENT DOCUMENTS

2003/0216971 A1* 11/2003 Sick ................. G06Q 30/06
                                                    705/7.36
2012/0204582 A1*  8/2012 Yazaki .............. F25B 49/005
                                                      62/126
(Continued)

FOREIGN PATENT DOCUMENTS

JP           7-43001 A      2/1995
JP         9-273795 A     10/1997
(Continued)

OTHER PUBLICATIONS

Extended European Search Report issued in corresponding European Application No. 17916829.9 dated Apr. 22, 2020.
(Continued)

*Primary Examiner* — Nathan L Laughlin
(74) *Attorney, Agent, or Firm* — Birch, Stewart, Kolasch & Birch, LLP.

(57) ABSTRACT

In an operation control device (10), a plan selection unit (15) determines, at a time point midway through a time zone where an operation of an air conditioner (54) is controlled along one control plan among a plurality of control plans, whether a weather change pattern corresponding to the one control plan deviates from an actual weather change pattern, based on weather data. If deviates, the plan selection unit (15) selects a weather change pattern that is different from the weather change pattern corresponding to the one control plan, from among a plurality of weather change patterns, in accordance with the weather data. During a rest of the time zone, the plan selection unit (15) controls the operation of the air conditioner (54) along a control plan corresponding to the different weather change pattern, among the plurality of control plans.

12 Claims, 13 Drawing Sheets

(51) Int. Cl.
*F24F 11/64* (2018.01)
*F24F 11/65* (2018.01)
*F24F 11/56* (2018.01)
*G05B 19/042* (2006.01)
*F24F 140/60* (2018.01)
*F24F 130/20* (2018.01)
*F24F 140/50* (2018.01)
*F24F 130/10* (2018.01)
*F24F 110/40* (2018.01)
*F24F 110/10* (2018.01)
*F24F 110/12* (2018.01)

(52) U.S. Cl.
CPC ............ *F24F 11/80* (2018.01); *G05B 19/042* (2013.01); *F24F 2110/10* (2018.01); *F24F 2110/12* (2018.01); *F24F 2110/40* (2018.01); *F24F 2130/10* (2018.01); *F24F 2130/20* (2018.01); *F24F 2140/50* (2018.01); *F24F 2140/60* (2018.01); *G05B 2219/2614* (2013.01)

(56) References Cited

U.S. PATENT DOCUMENTS

2012/0259469 A1* 10/2012 Ward .................. F24F 11/30
700/276
2015/0253027 A1* 9/2015 Lu ....................... F24F 11/30
700/276
2015/0378373 A1* 12/2015 Sprinkle ............ G05D 23/1917
700/276
2016/0054018 A1 2/2016 Motodani et al.
2016/0109147 A1 4/2016 Uno et al.
2016/0276832 A1* 9/2016 Kawai ..................... H02J 3/14

FOREIGN PATENT DOCUMENTS

| | | |
|---|---|---|
| JP | 10-300167 A | 11/1998 |
| JP | 2002-22239 A | 1/2002 |
| JP | 2006-266520 A | 10/2006 |
| JP | 2008-82642 A | 4/2008 |
| JP | 2010-249454 A | 11/2010 |
| JP | 2011-214794 A | 10/2011 |
| JP | 2015-87092 A | 5/2015 |
| JP | 2016-115271 A | 6/2016 |
| WO | WO 2014/171314 A1 | 10/2014 |
| WO | WO 2014/203311 A1 | 12/2014 |

OTHER PUBLICATIONS

International Search Report (PCT/ISA/210) issued in PCT/JP2017/024649, dated Aug. 29, 2017.

* cited by examiner

OPERATION DEVICE AND METHOD TO CONTROL AN AIR CONDITIONER BASED ON WEATHER CHANGE PATTERNS

TECHNICAL FIELD

The present invention relates to an operation control device, an air conditioning system, an operation control method, and an operation control program.

BACKGROUND ART

In offices, factories, and so on, the maximum demand power is treated as the contract power according to demand contracts. When power consumption exceeds the maximum demand power, the contract power goes high. Therefore, power control is performed so that the power consumption does not exceed the maximum demand power.

In offices and so on, air conditioning equipment occupies a large proportion in power consumption. In order to ensure that the power consumption does not exceed the maximum demand power, it is important to control air conditioning equipment so as to suppress its power consumption.

The air conditioning equipment is controlled by the following procedure.

An air conditioning load is predicted from a weather prediction, a room usage schedule, and so on of a certain period. Based on the prediction result, the maximum demand power and a time zone where the maximum demand power occurs are calculated. An air conditioning control plan to reduce power consumption during that time zone is formulated. The air conditioning equipment is controlled based on the control plan.

Prediction of the maximum demand power and of the time zone may fail depending on an air conditioning load status such as the actual equipment usage and the weather. When the prediction fails, it is necessary to modify the control plan appropriately to bring the power consumption closer to the planned value.

With the technique described in Patent Literature 1, an air conditioning load is predicted using a building model. An operation plan of air conditioning equipment is prepared based on the prediction result. Air conditioning equipment is controlled along the operation plan.

With the technique described in Patent Literature 2, when an error occurs between the predicted load and the actual load during operation of air conditioning equipment, the operation plan is formulated again from the beginning.

CITATION LIST

Patent Literature

Patent Literature 1: JP 2011-214794 A
Patent Literature 2: JP 2006-266520 A

SUMMARY OF INVENTION

Technical Problem

The technique described in Patent Literature 1 cannot sufficiently deal with fluctuations in air conditioning load with respect to the prediction.

With the technique described in Patent Literature 2, whenever an air conditioning load fluctuates with respect to prediction, time-consuming processing such as air conditioning load prediction and re-calculation of an operation plan for air conditioning equipment is executed. Therefore, a modified operation plan cannot be applied to the process immediately, and there is a possibility that an error with respect to a planned value of power consumption per day cannot be absorbed.

It is an objective of the present invention to be able to apply a modified plan immediately even when an air conditioning load fluctuates with respect to the prediction.

Solution to Problem

An operation control device according to one aspect of the present invention includes:

a data storage unit to store a plurality of weather change patterns as a pattern of how weather changes, and store a plurality of control plans as a plan for controlling an operation of an air conditioning equipment in accordance with the plurality of weather change patterns, respectively; and a plan selection unit to determine, at a time point midway through a time zone where the operation of the air conditioning equipment is controlled along one control plan among the plurality of control plans stored in the data storage unit, whether a weather change pattern corresponding to the one control plan deviates from an actual weather change pattern, based on weather data indicating a time-series weather observation result of up to the time point; if deviates, select a weather change pattern that is different from the weather change pattern corresponding to the one control plan, from among the plurality of weather change patterns stored in the data storage unit, in accordance with the weather data; and during a rest of the time zone, control the operation of the air conditioning equipment along a control plan corresponding to the different weather change pattern, among the plurality of control plans.

Advantageous Effects of Invention

In the present invention, when an air conditioning load fluctuates with respect to a prediction, a modified plan is selected from among a plurality of control plans formulated in advance. Thus, even when the air conditioning load fluctuates with respect to the prediction, the modified plan can be applied immediately.

DESCRIPTION OF EMBODIMENTS

Figure 1:
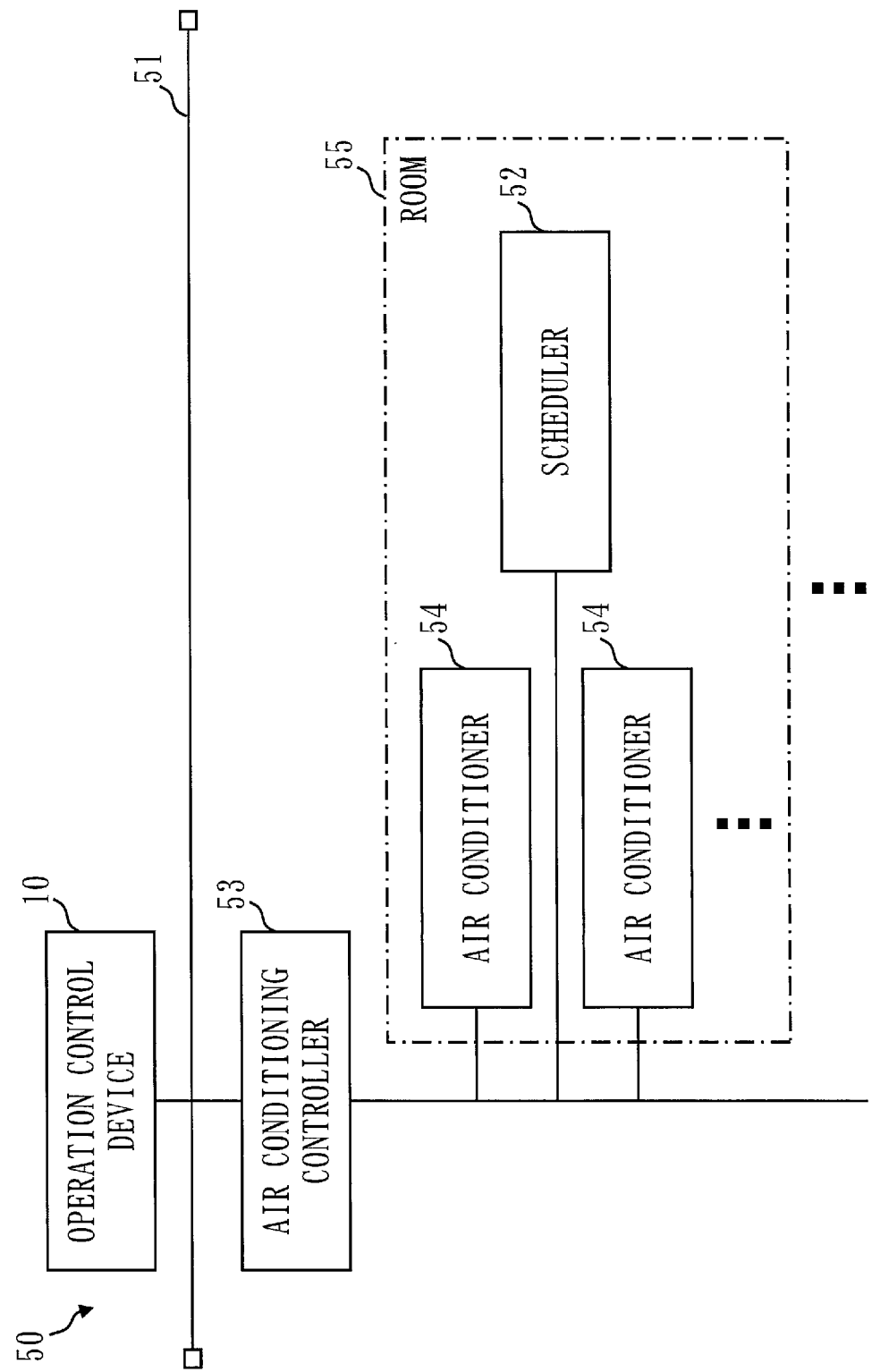
FIG. 1 is a block diagram illustrating a configuration of an air conditioning system according to Embodiment 1.

Embodiments of the present invention will be described hereinafter referring to drawings. In the drawings, the same or equivalent portions are denoted by the same reference numeral. In the description of the embodiments, explanation on the same or equivalent portions will be omitted or simplified appropriately. Note that the present invention is not limited to the embodiments described below, and various modifications can be made as needed. For example, of the embodiments described below, two or more embodiments may be implemented by combination. Also, among the embodiments described below, one embodiment or a combination of two or more embodiments may be implemented partly.

Embodiment 1

This embodiment will be described referring to FIGS. 1 to 8.

*Description of Configuration*

A configuration of an air conditioning system 50 according to this embodiment will be described referring to FIG. 1.

The air conditioning system 50 is installed within arbitrary facilities. In the facilities, there is one or more rooms 55 each forming an individual space. The room 55 is, for example, an office.

The air conditioning system 50 is provided with at least one operation control device 10, one or more schedulers 52, one or more air conditioning controllers 53, and a plurality of air conditioners 54 which are air conditioning equipment.

The operation control device 10 and the air conditioning controller 53 are connected to a LAN 51 where "LAN" is an abbreviation for local area network. In this embodiment, the operation control device 10 and the air conditioning controller 53 communicate with each other via the LAN 51. Alternatively, the operation control device 10 and the air conditioning controller 53 may communicate with each other not via the LAN 51 alone, but via another network such as a WAN and the Internet, or may communicate with each other directly without a network such as the LAN 51 intervening. Alternatively, the air conditioning controller 53 may be integrated with the operation control device 10. Note that "WAN" is an abbreviation for wide area network.

The scheduler 52 and the air conditioner 54 are installed in the room 55. The scheduler 52 is a terminal with which a schedule of a user of the room 55 is registered. The air conditioner 54 is an indoor unit to be controlled by the air conditioning controller 53. Although not illustrated, another air conditioning equipment which consumes power, such as an outdoor unit, is also controlled by the air conditioning controller 53.

The number of rooms 55 may be one, or alternatively there may be a plurality of rooms 55. In this embodiment, the number of air conditioning controllers 53 is one for one room 55. However, a plurality of air conditioning controllers 53 may be provided to one room 55. Alternatively, one air conditioning controller 53 may be provided to a plurality of rooms 55.

One or a plurality of air conditioners 54 are connected to one air conditioning controller 53. The operation of the air conditioner 54 is controlled by the operation control device 10 via the connected air conditioning controller 53. The usage schedule of the room 55 is registered in the scheduler 52 in advance by one or more users. The number of people occupying the room changes according to this schedule. Personal data being personal information of each user is also contained in the scheduler 52 and managed. The personal data includes personal information concerning temperature preference such as being sensitive to heat or the cold.

Figure 2:
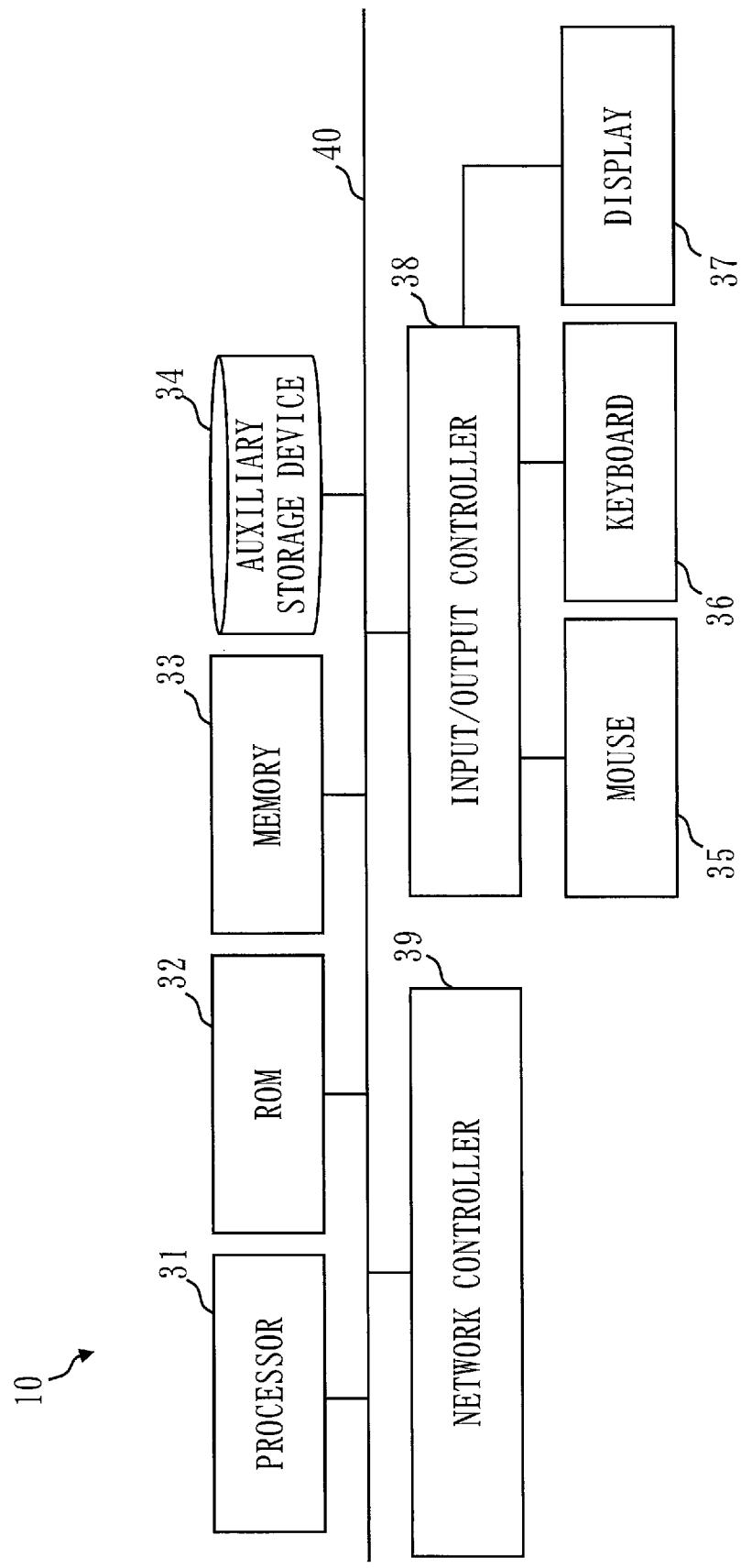
FIG. 2 is a block diagram illustrating a hardware configuration of an operation control device according to Embodiment 1.
Figure 3:
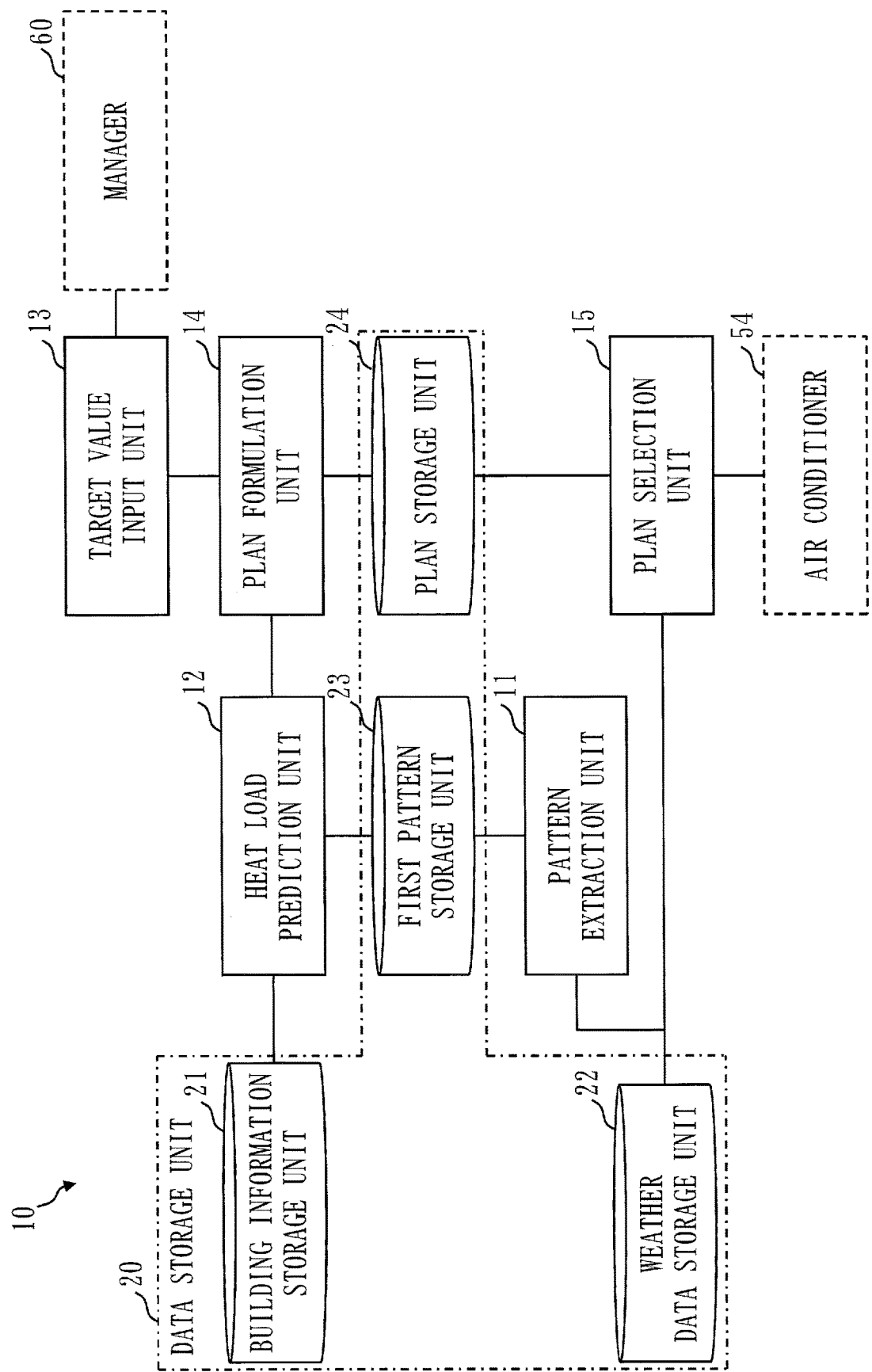
FIG. 3 is a block diagram illustrating a functional configuration of the operation control device according to Embodiment 1.

A configuration of the operation control device 10 according to this embodiment will be described referring to FIGS. 2 and 3.

The operation control device 10 is a computer. The operation control device 10 is provided with a processor 31 as well as other hardware devices such as a ROM 32, a memory 33, an auxiliary storage device 34, an input/output controller 38, and a network controller 39. Note that "ROM" is an abbreviation of read only memory. The processor 31 is connected to the other hardware devices via an internal bus 40 and controls these other hardware devices.

The operation control device 10 is provided with a pattern extraction unit 11, a heat load prediction unit 12, a target value input unit 13, a plan formulation unit 14, a plan selection unit 15, and a data storage unit 20, as functional elements. Functions of the pattern extraction unit 11, heat load prediction unit 12, target value input unit 13, plan formulation unit 14, and plan selection unit 15 are implemented by software. Although in this embodiment a function of the data storage unit 20 is implemented by the auxiliary storage device 34, it may be implemented by the memory 33.

The processor 31 is a device that executes an operation control program. The operation control program is a program that implements the functions of the pattern extraction unit 11, heat load prediction unit 12, target value input unit 13, plan formulation unit 14, and plan selection unit 15. The processor 31 is, for example, a CPU where "CPU" is an abbreviation for central processing unit.

The memory 33 is, for example, a flash memory or RAM where "RAM" is an abbreviation for random access memory.

The auxiliary storage device 34 is, for example, a flash memory or HDD where "HDD" is an abbreviation for hard disk drive.

Input devices such as a mouse 35 and a keyboard 36 are connected to the input/output controller 38 and controlled by the input/output controller 38. The input devices are devices that are operated by the user to input data to the operation control program. Another type of input device such as a touch panel may be used together with the mouse 35 and the keyboard 36, or in addition to the mouse 35 and the keyboard 36.

A display 37 is also connected to the input/output controller 38 and controlled by the input/output controller 38. The display 37 is a device that displays data outputted from the operation control program onto a screen. The display 37 is, for example, an LCD where "LCD" is an abbreviation for liquid crystal display.

The network controller 39 involves a receiver to receive data inputted to the operation control program and a transmitter to transmit data outputted from the operation control program.

The operation control program is stored in the auxiliary storage device 34. The operation control program is loaded to the memory 33, read into the processor 31, and executed by the processor 31. Not only the operation control program but also an OS is stored in the auxiliary storage device 34 where "OS" is an abbreviation for operating system. The processor 31 executes the operation control program while executing the OS.

The operation control program and the OS may be stored in the ROM 32 or memory 33. The operation control program may be incorporated in the OS partly or entirely.

The operation control device 10 may be provided with a plurality of processors that replace the processor 31. The plurality of processors share execution of the operation control program. Each processor is, for example, a CPU.

Data, information, signal values, and variable values which are utilized, processed, or outputted by the operation control program are stored in the memory 33, the auxiliary storage device 34, or a register or cache memory in the processor 31.

The operation control program is a program that causes the computer to execute processes that are the pattern extraction unit 11, heat load prediction unit 12, target value input unit 13, plan formulation unit 14, and plan selection unit 15 with their "unit" being replaced by "process". Alternatively, the operation control program is a program that causes the computer to execute procedures that are the pattern extraction unit 11, heat load prediction unit 12, target value input unit 13, plan formulation unit 14, and plan selection unit 15 with their "unit" being replaced by "procedure". The operation control program may be recorded in a computer-readable medium such as a CD-ROM and a USB memory and may be provided in the form of the computer-readable medium, or may be provided in the form of a program product. Note that "CD-ROM" is an abbreviation for compact disk read only memory and that "USB" is an abbreviation for universal serial bus.

The data storage unit 20 has a building information storage unit 21, a weather data storage unit 22, a first pattern storage unit 23, and a plan storage unit 24.

The building information storage unit 21 stores geographic information of a building in which the room 55 is located, information indicating a feature of the building, and information concerning equipment in the building. The geographic information of the building includes, for example, information indicating a locational situation such as the latitude, longitude, and orientation of the building. The information indicating the feature of the building includes, for example, information indicating a number of floors, age, area, the material of the outer wall, and the material of the inner wall, of the building, includes information indicating a location such as a floor number and orientation of each room 55 of the building, and includes information indicating a size, shape, number of windows, air leakage efficiency, and seat position of the user, of each room 55. The information concerning the equipment in the building includes, for example, information indicating the quantity of air conditioners 54 in each room 55, model number, performance, years of use, and installation location of the air conditioner 54, and connection of the air conditioner 54 with the air conditioning controller 53 in each room 55.

The weather data storage unit 22 stores weather data. The weather data is data pertaining to the weather of the location or area where the building is located. The weather data includes, for example, past actual values, present values, and forecast values of each of temperature, humidity, solar radiation, change in wind direction and wind speed, sunshine duration per day, and precipitation. The weather data is used for extracting a weather change pattern.

The first pattern storage unit 23 stores a plurality of weather change patterns as a pattern of how the weather changes.

The plan storage unit 24 stores a plurality of control plans as a plan for controlling the operation of the air conditioner 54 in accordance with the plurality of weather patterns, respectively, stored in the first pattern storage unit 23.

*Description of Operation*

An operation of the operation control device 10 according to this embodiment will be described referring to FIGS. 4 to 8 in addition to FIGS. 1 to 3. The operation of the operation control device 10 is equivalent to an operation control method according to this embodiment.

Prior to start of controlling the air conditioner 54, the operation control device 10 extracts a large number of weather change patterns and formulates control plans for the air conditioner 54.

Figure 4:
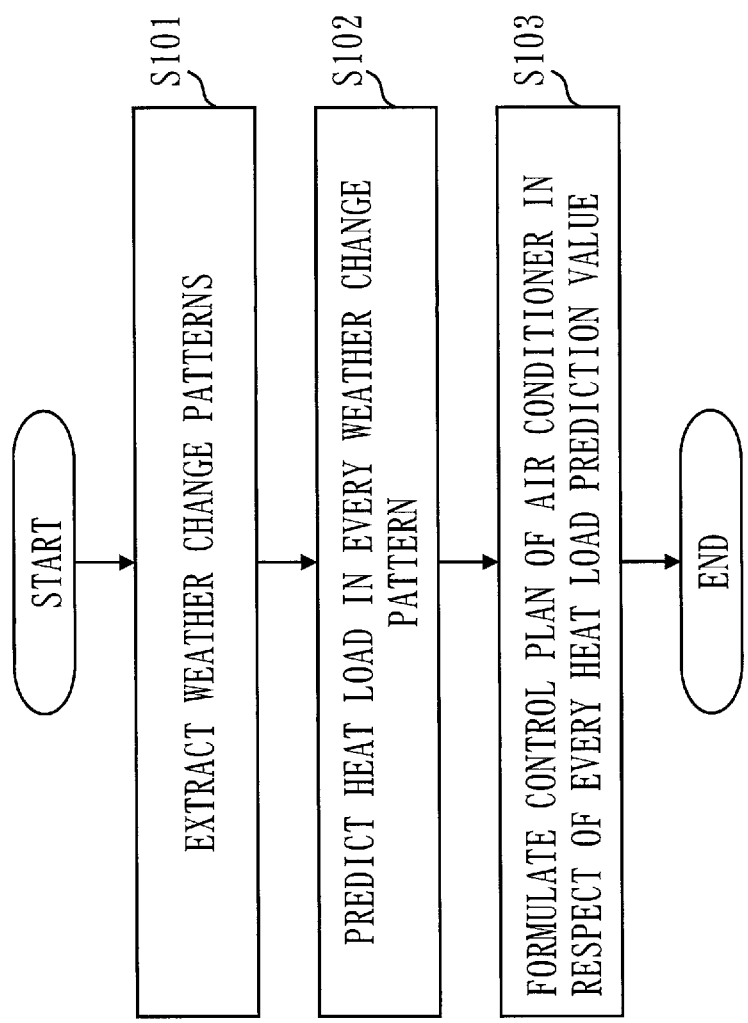
FIG. 4 is a flowchart illustrating an operation of the operation control device according to Embodiment 1.

FIG. 4 illustrates a procedure of extracting the large number of weather change patterns and formulating the control plans for the air conditioner 54.

In step S101, the pattern extraction unit 11 refers to the weather data stored in the weather data storage unit 22 and extracts the large number of weather change patterns which can occur during a specific period. The pattern extraction unit 11 stores the extracted weather change patterns to the first pattern storage unit 23.

In step S102, the heat load prediction unit 12 refers to various information stored in the building information storage unit 21 and calculates a prediction value of the heat load of the building for every weather change pattern stored in the first pattern storage unit 23. Calculation of the heat load can use an existing standard such as SHASE-S112-2000 which is the standard of The Society of Heating, Air-Conditioning and Sanitary Engineers of Japan. Alternatively, the calculation can use software such as HASP, BEST, and EnergyPlus.

The target value input unit 13 receives input of a target value of the power consumption of the air conditioner 54 and a target value of an indoor comfort degree from a manager 60 in advance via the input devices such as the mouse 35 and the keyboard 36. The target value of the power consumption is the target value of total power consumption amount in the specific period or the target value of peak power. The target value of the indoor comfort degree is the target value of the indoor comfort degree in the specific period.

In step S103, in respect of the heat load prediction value calculated by the heat load prediction unit 12 for every weather change pattern, the plan formulation unit 14 formulates such a control plan of the air conditioner 54 that satisfies the specified target value of the power consumption and the specified target value of the indoor comfort degree. The plan formulation unit 14 stores a set of a weather change pattern and the formulated control plan to the plan storage unit 24. In formulating the control plan that satisfies the target values, various well-known methods can be used such as existing mathematical programming, multi-objective mathematical programming, and machine learning. As the existing mathematical programming, Newton's method, sequential quadratic programming, dynamic planning, or the like can be used. As the multi-objective mathematical programming, a multi-objective genetic algorithm, a multi-objective particle swarm optimization, or the like can be used. To calculate the indoor comfort degree, an existing warmth-coldness index such as PMV, SET, and UTCI can be used. Note that "PMV" is an abbreviation for predicted mean value, "SET" is an abbreviation for standard new effective temperature, and "UTCI" is an abbreviation for universal thermal climate index.

In cases where no control plan can satisfy a given target value, the plan formulation unit 14 may prompt the manager 60 via the display 37 to input the target value again.

Figure 5:
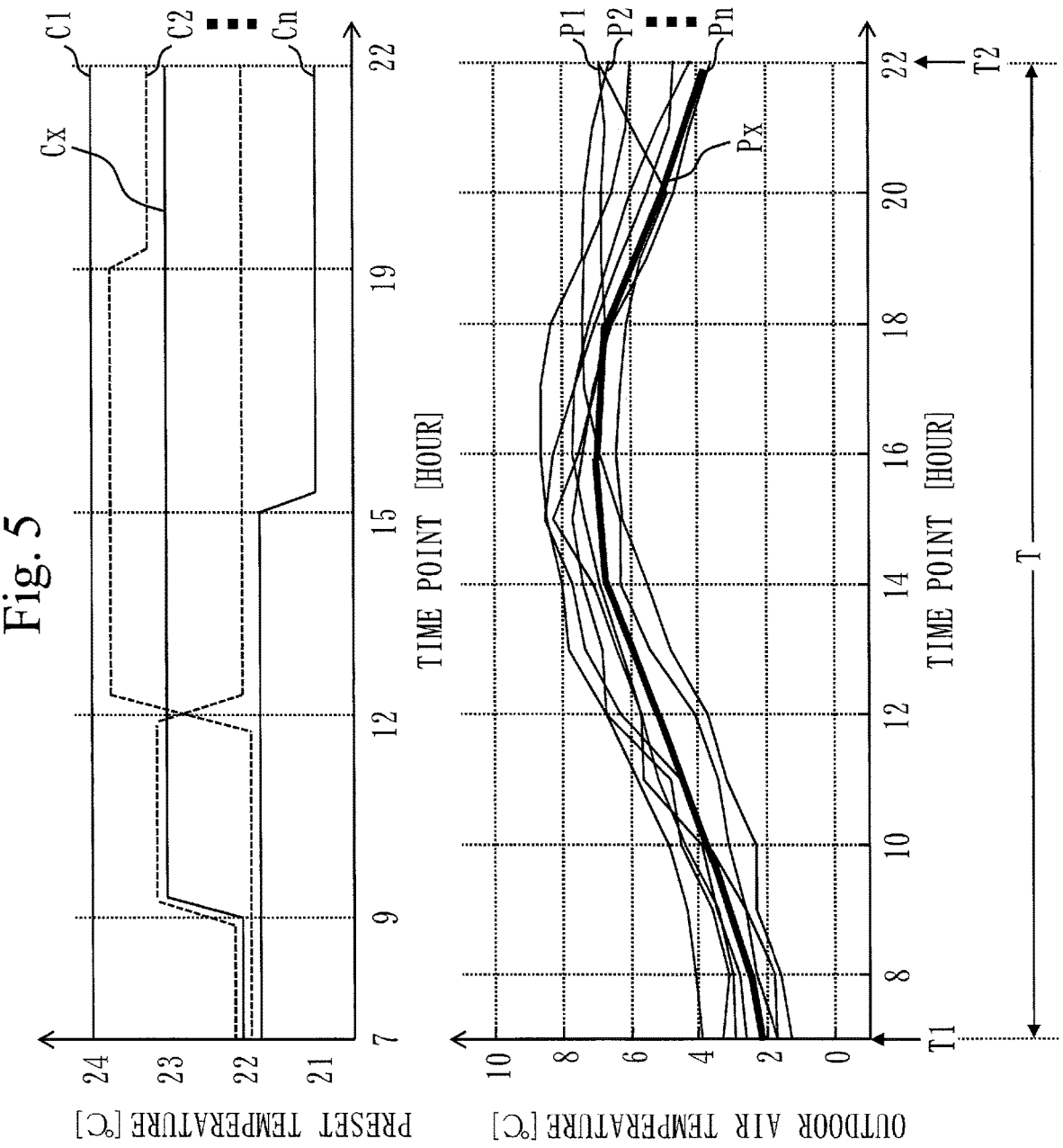
FIG. 5 presents graphs illustrating weather change patterns and control plans according to Embodiment 1.

FIG. 5 illustrates the weather change patterns extracted by the pattern extraction unit 11 and the control plans formulated by the plan formulation unit 14 in this embodiment.

The pattern extraction unit 11 extracts weather change patterns P1 to Pn that can occur in the specific period from past weather data stored in the weather data storage unit 22. The heat load prediction unit 12 predicts heat load for each of the weather change patterns P1 to Pn. The plan formulation unit 14 formulates control plans C1 to Cn of the air conditioner 54 for the weather change patterns P1 to Pn, respectively. The "specific period" may be any period, but in this embodiment, it is set to a period of 7 o'clock to 22 o'clock of the winter season. As the weather change pattern, the change pattern of the outdoor air temperature is calculated. As the control plan for the air conditioner 54, a plan of the preset temperature is calculated.

As described above, in this embodiment, the operation control device 10 extracts the weather change patterns P1 to Pn prior to start of controlling the air conditioner 54. Based on the weather change patterns P1 to Pn, the operation control device 10 formulates the control plans C1 to Cn as control plan candidates. The operation control device 10 stores the control plans C1 to Cn to the plan storage unit 24.

After that, the operation control device 10 selects a control plan to be used actually for controlling the air conditioner 54 from among the control plan candidates stored in the plan storage unit 24, and starts operation control over the air conditioner 54.

Figure 6:
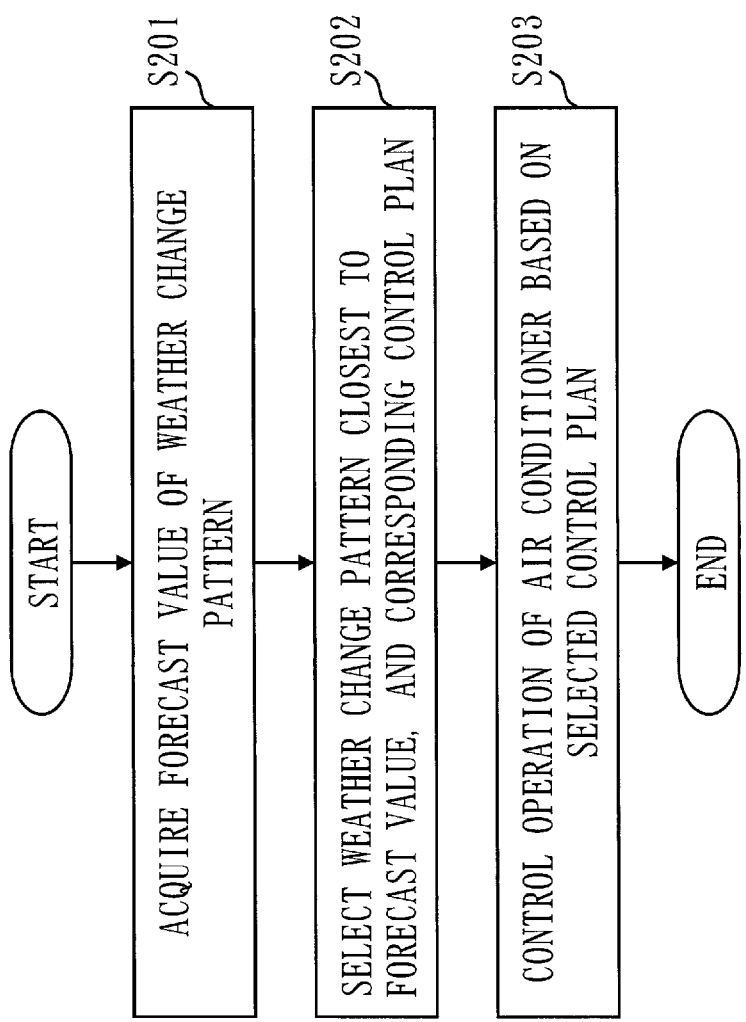
FIG. 6 is a flowchart illustrating an operation of the operation control device according to Embodiment 1.

FIG. 6 illustrates a procedure of starting operation control over the air conditioner 54 in this embodiment. This procedure is implemented at a time point T1 illustrated in FIG. 5. Note that the time point T1 is the time point at which operation control over the air conditioner 54 is started. In this embodiment, the time point T1 is 7 o'clock. Note that a time point T2 is the time point at which operation control over the air conditioner 54 is ended. In this embodiment, the time point T2 is 22 o'clock.

In step S201, the plan selection unit 15 acquires a forecast value of a weather change pattern that might occur during a specific period in the future, from the weather data storage unit 22. That is, the plan selection unit 15 predicts a weather change pattern that occurs in a period of the time point T1 to the time point T2 based on the forecast weather data stored in the weather data storage unit 22.

In step S202, the plan selection unit 15 selects a set of a weather change pattern Px the closest to the predicted weather change pattern and a control plan Cx corresponding to the weather change pattern Px, from the plan storage unit 24. More specifically, the plan selection unit 15 finds individual sums of absolute values of differences between hourly forecast values of the acquired weather change pattern and hourly outdoor air temperatures of the individual weather change patterns P1 to Pn stored in the first pattern storage unit 23. The plan selection unit 15 selects a weather change pattern Px that provides the smallest sum, and a control plan Cx corresponding to the weather change pattern Px.

In step S203, the plan selection unit 15 controls operation of the air conditioner 54 based on the selected control plan Cx.

As described above, in this embodiment, when starting control over the air conditioner 54, the operation control device 10 selects the weather change pattern Px from among the weather change patterns P1 to Pn. The operation control device 10 selects the control plan Cx corresponding to the weather change pattern Px from among the control plans C1 to Cn. The operation control device 10 controls operation of the air conditioner 54 along the control plan Cx.

After that, the operation control device 10 modifies the control plan for the air conditioner 54 as necessary, using the control plan candidates stored in the plan storage unit 24.

Figure 7:
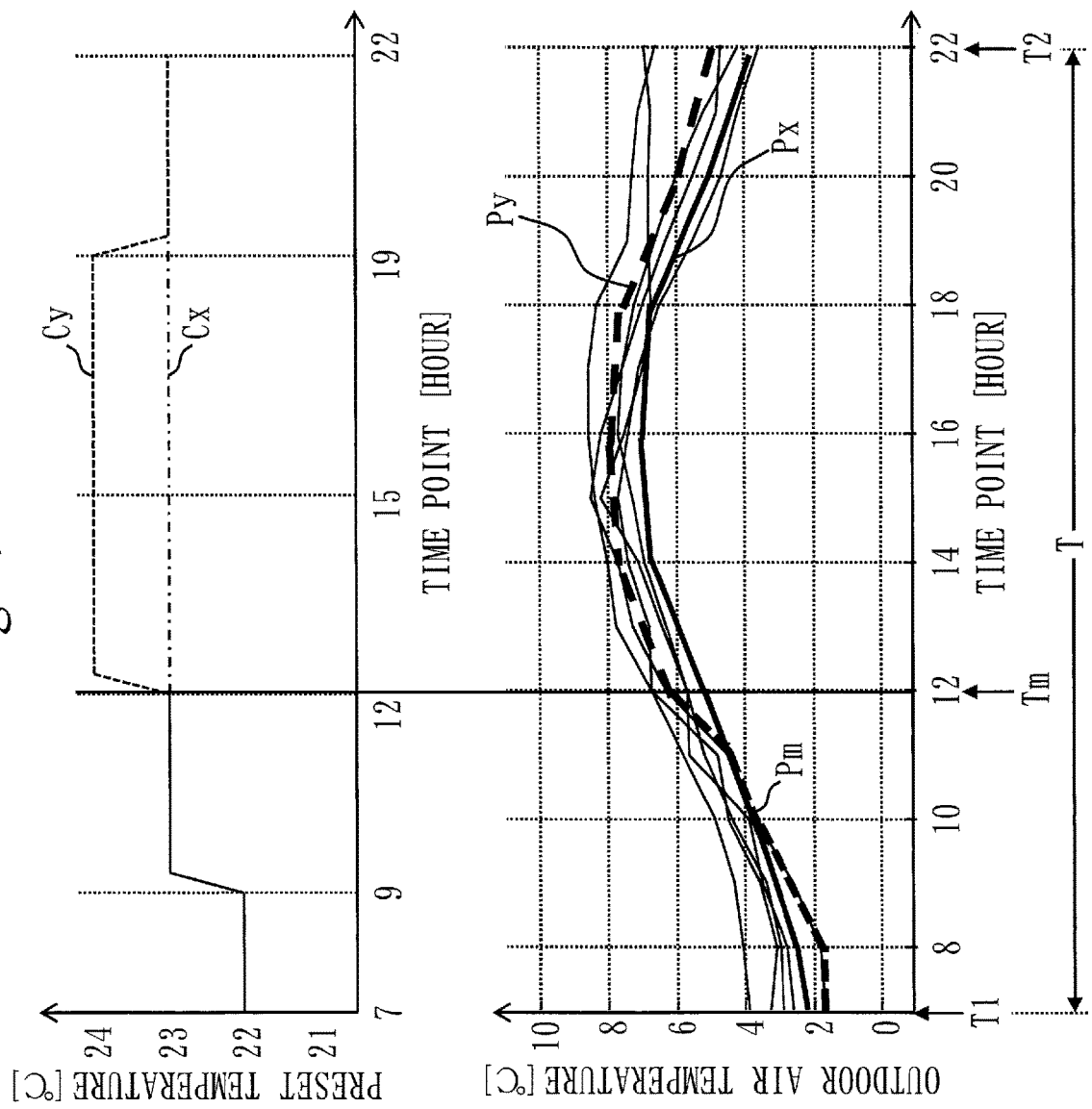
FIG. 7 presents graphs illustrating weather change patterns and control plans according to Embodiment 1.

FIG. 7 illustrates the weather change patterns selected by the plan selection unit 15 and the control plans selected by the plan selection unit 15 in this embodiment.

Figure 8:
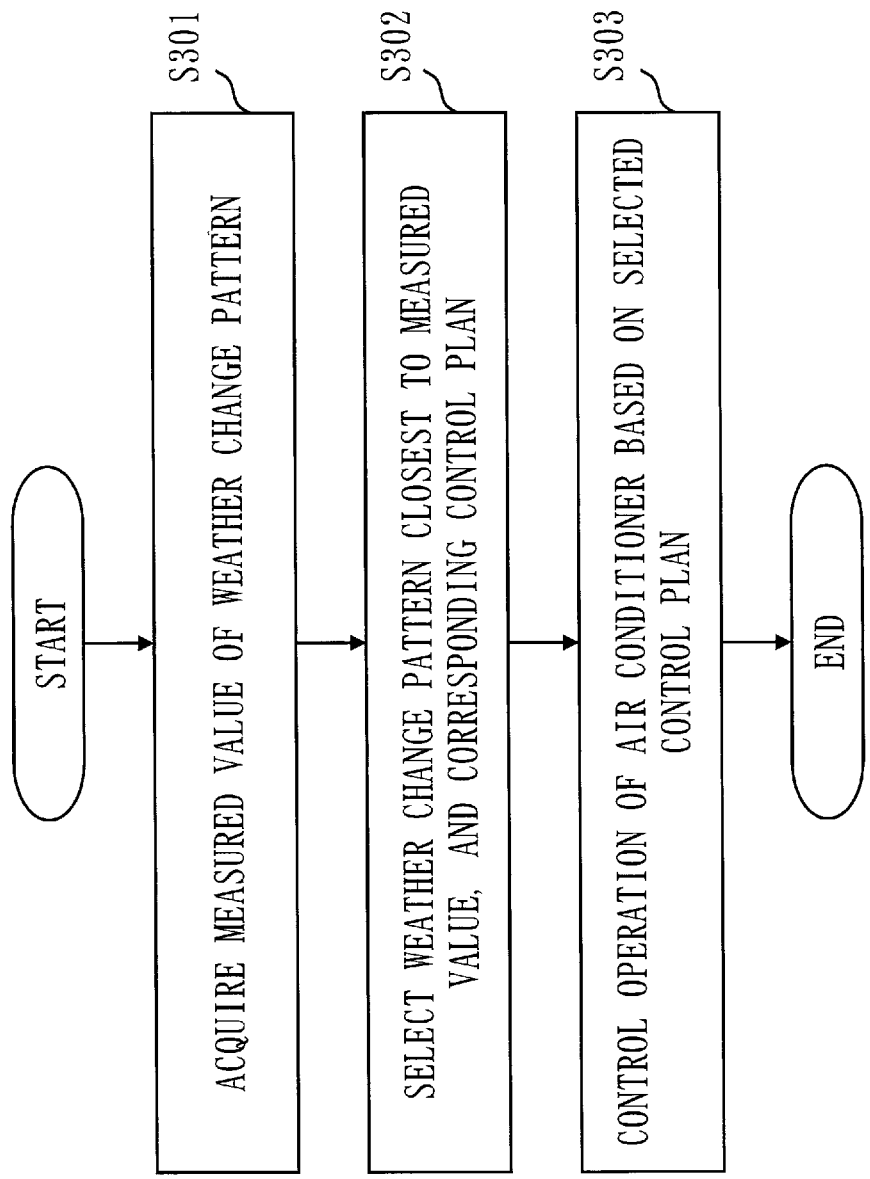
FIG. 8 is a flowchart illustrating an operation of the operation control device according to Embodiment 1.

FIG. 8 illustrates a procedure of modifying the control plan for the air conditioner 54 in this embodiment. This procedure is implemented at a time point Tm indicated in FIG. 7. The time point Tm is the time point at which it is determined whether or not the control plan needs modification. The time point Tm may be a time point between the time point T1 and the time point T2, but in this embodiment, the time point Tm is fixed at 12 o'clock.

In step S301, the plan selection unit 15 acquires, from the weather data storage unit 22, a measured value of a weather change pattern Pm from the time point T1, at which control over the air conditioner 54 is started, to the present time. That is, the plan selection unit 15 extracts the weather change pattern Pm occurring during a period of the time point T1 to the time point Tm from the last weather data stored in the weather data storage unit 22. The plan selection unit 15 determines whether the extracted weather change pattern Pm deviates from the weather change pattern Px selected in step S202. More specifically, the plan selection unit 15 finds a sum of absolute values of differences between hourly measured values of the acquired weather change pattern Pm and hourly outdoor air temperatures of the weather change pattern Px stored in the first pattern storage unit 23. If the sum exceeds a threshold value, the plan selection unit 15 determines that the weather change pattern Pm deviates from the weather change pattern Px. Alternatively, the plan selection unit 15 may determine whether the measured value deviates from the forecast value by comparing the measured value of the acquired weather change pattern Pm and the forecast value of the weather change pattern acquired in step S201.

When the weather change pattern Pm does not deviate from the weather change pattern Px, the plan selection unit 15 successively controls the operation of the air conditioner 54 based on the control plan Cx selected in step S202. When the weather change pattern Pm deviates from the weather change pattern Px, the plan selection unit 15 determines that the control plan for the air conditioner 54 needs modification, and executes a process of step S302.

In step S302, the plan selection unit 15 selects a set of a weather change pattern Py the closest to the extracted weather change pattern Pm and a control plan Cy corresponding to the weather change pattern Py, from the plan storage unit 24. More specifically, the plan selection unit 15 finds individual sums of absolute values of differences between hourly measured values of the acquired weather change pattern Pm and hourly outdoor air temperatures from the time point T1 to the time point Tm of the individual weather change patterns P1 to Pn stored in the first pattern storage unit 23. The plan selection unit 15 selects a weather change pattern Py that provides the smallest sum, and a control plan Cy corresponding to the weather change pattern Py.

In step S303, the plan selection unit 15 cancels operation control over the air conditioner 54 which has been conducted along the control plan Cx. The plan selection unit 15 controls operation of the air conditioner 54 based on the newly selected control plan Cy, thereby modifying the control plan for the air conditioner 54.

As a result, during operation control over the air conditioner 54, even if the air conditioning load fluctuates from the prediction due to the weather conditions, a control plan can be selected again from among the large number of control plans formulated in advance in accordance with the fluctuations in air conditioning load. That is, the control plan can be modified in accordance with the weather conditions. Modification of the control plan does not require prediction of the weather change pattern, prediction of the heat load, and recalculation of the control plan, so that the calculation cost can be suppressed. Since modification of the control plan does not take much time, the control plan can be modified before the error grows. As a result, it is possible to keep controlling the air conditioner 54 while maintaining the power consumption and the indoor comfort degree that are close to the planned values given as the targets.

As described above, in this embodiment, at the time point Tm midway through a time zone T where operation of the air conditioner 54 is controlled along one control plan Cx among the plurality of control plans C1 to Cn stored in the data storage unit 20, the plan selection unit 15 determines whether the weather change pattern Px corresponding to the control plan Cx deviates from the actual weather change pattern Pm, based on the weather data indicating a time-series weather observation result of up to the time point Tm. If the weather change pattern Px deviates, the plan selection unit 15 selects a weather change pattern Py that is different from the weather change pattern Px corresponding to the control plan Cx, from among the plurality of weather change patterns P1 to Pn stored in the data storage unit 20, in accordance with the weather data. During the rest of the time zone T, the plan selection unit 15 controls operation of the air conditioner 54 along the control plan Cy corresponding to the weather change pattern Py, among the plurality of control plans C1 to Cn. Note that the time zone T is a period of the time point T1 to the time point T2.

In this embodiment, the target values of the power consumption and indoor comfort degree are inputted directly by the manager 60. Alternatively, candidate values of the target values may be prepared, and desired values may be selected by the manager 60 from among the candidate values.

In this embodiment, both the power consumption of the air conditioner 54 and the comfort of the space where the air conditioner 54 is installed are considered, but alternatively only one of them may be considered. That is, inputting of a target value may be omitted for either one of the power consumption and the indoor comfort degree.

Instead of the indoor comfort degree, another type of indoor/outdoor atmosphere value may be used.

In this embodiment, whether or not the control plan for the air conditioner 54 needs modification is determined at one time point Tm only. Alternatively, whether or not the control plan needs modification may be determined at a plurality of time points. In this embodiment, the calculation cost for modification of the control plan can be suppressed, as described above. Also, modification of the control plan does not take much time. Therefore, it is desirable to increase the frequency of determination as to whether or not the control plan needs modification.

Description of Effect of Embodiment

In this embodiment, when an air conditioning load fluctuates from the prediction, a modified plan is selected from among a plurality of control plans formulated in advance. Therefore, even when the air conditioning load fluctuates from the prediction, a modified plan can be applied immediately.

In this embodiment, even when the air conditioning load fluctuates from the prediction during control over the air conditioner 54, the control plan for the air conditioner 54 is modified immediately so that the power consumption and the indoor comfort degree fall within target ranges of the specific period. Therefore, it is possible to keep controlling the air conditioner 54 while maintaining a state where the power consumption and the indoor comfort degree are close to the planned values.

*Other Configuration*

In this embodiment, the functions of the pattern extraction unit 11, heat load prediction unit 12, target value input unit 13, plan formulation unit 14, and plan selection unit 15 are implemented by software. In a modification, the functions of the pattern extraction unit 11, heat load prediction unit 12, target value input unit 13, plan formulation unit 14, and plan selection unit 15 may be implemented by a combination of software and hardware. That is, some of the functions of the pattern extraction unit 11, heat load prediction unit 12, target value input unit 13, plan formulation unit 14, and plan selection unit 15 may be implemented by dedicated hardware, and the remaining functions may be implemented by software.

The dedicated hardware is, for example, a single circuit, a composite circuit, a programmed processor, a parallel-programmed processor, a logic IC, a GA, an FPGA, or an ASIC. Note that "IC" is an abbreviation for integrated circuit; "GA" is an abbreviation for gate array; "FPGA" is an abbreviation for field-programmable gate array; and "ASIC" is an abbreviation for application specific integrated circuit.

The processor 31 and the dedicated hardware are both processing circuitry. That is, regardless of whether the functions of the pattern extraction unit 11, heat load prediction unit 12, target value input unit 13, plan formulation unit 14, and plan selection unit 15 are implemented by software or by a combination of software and hardware, the functions of the pattern extraction unit 11, heat load prediction unit 12, target value input unit 13, plan formulation unit 14, and plan selection unit 15 are implemented by the processing circuitry.

Embodiment 2

Figure 9:
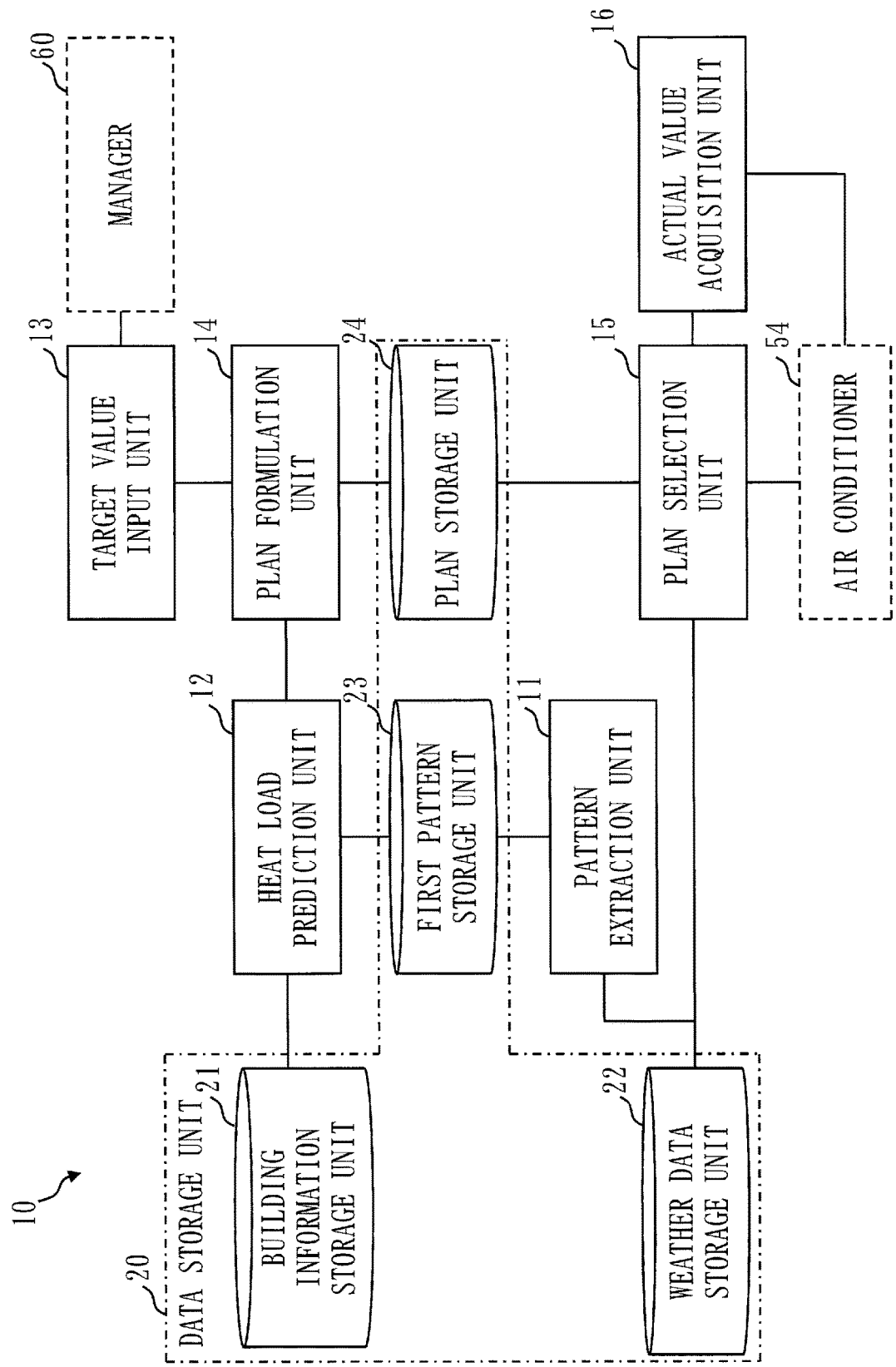
FIG. 9 is a block diagram illustrating a functional configuration of an operation control device according to Embodiment 2.

This embodiment will be described referring to FIG. 9 mainly regarding differences from Embodiment 1.

*Description of Configuration*

A configuration of an operation control device 10 according to this embodiment will be described referring to FIG. 9.

The operation control device 10 is provided with a pattern extraction unit 11, a heat load prediction unit 12, a target value input unit 13, a plan formulation unit 14, a plan selection unit 15, a data storage unit 20, and additionally an actual value acquisition unit 16, as functional elements. Functions of the pattern extraction unit 11, heat load prediction unit 12, target value input unit 13, plan formulation unit 14, plan selection unit 15, and actual value acquisition unit 16 are implemented by software.

In Embodiment 1, when modifying the control plan for the air conditioner 54, the weather change pattern Py the closest to the measured weather change pattern Pm is selected, and the control plan Cy corresponding to the weather change pattern Py is selected as a new control plan. However, in cases where, for example, the weather has changed heavily by the time point Tn at which the control plan is modified, even if a new control plan is selected, it is sometimes difficult to achieve the target power consumption because, for example, the power has already been used excessively or has hardly been used. In view of this, according to this embodiment, when modifying the control plan for an air conditioner 54, the actual value of the power consumption before plan modification is referred to, and such a control plan is selected that according to which the power consumption during a specific period becomes the closest to the planned value after the plan modification.

\*\*\*Description of Operation\*\*\*

An operation of the operation control device 10 according to this embodiment will be described referring to FIG. 9. The operation of the operation control device 10 is equivalent to an operation control method according to this embodiment.

A procedure of extracting a weather change pattern and formulating a control plan for the air conditioner 54 is the same as that of Embodiment 1 illustrated in FIG. 4, and accordingly its description will be omitted.

Also, a procedure of starting operation control over the air conditioner 54 is the same as that of Embodiment 1 illustrated in FIG. 6, and accordingly its description will be omitted.

A procedure of modifying the control plan for the air conditioner 54 in this embodiment will be described regarding differences from the procedure in Embodiment 1 illustrated in FIG. 8.

A process of step S301 is the same as that of Embodiment 1, and accordingly its description will be omitted.

At the time point Tm at which it is determined whether or not the control plan for the air conditioner 54 needs modification, the actual value acquisition unit 16 acquires an actual value of power consumption from a time point T1, at which operation control for the air conditioner 54 is started, to a time point Tm.

In step S302, the plan selection unit 15 refers to the actual value of the power consumption acquired by the actual value acquisition unit 16 and selects, from among control plans C1 to Cn stored in a plan storage unit 24, a control plan Cy that may allow achieving a target value of the power consumption and a target value of an indoor comfort degree throughout a specific period. More specifically, the plan selection unit 15 subtracts the actual value of the power consumption acquired by the actual value acquisition unit 16 from the target value of the total power consumption amount from a time point T1 to a time point T2 at which operation control over the air conditioner 54 ends. The subtraction result corresponds to a power amount that can be used from a time point Tm to the time point T2. The plan selection unit 15 calculates a prediction value of the power consumption from the time point Tm to the time point T2, for each of the control plans C1 to Cn. The plan selection unit 15 determines whether the calculated prediction value exceeds the power amount that can be used from the time point Tm to the time point T2, for each of the control plans C1 to Cn. The plan selection unit 15 selects a weather change pattern Py the closest to a weather change pattern Pm extracted in step S301, from among weather change patterns corresponding to control plans whose prediction values are equal to or less than the usable power amount. Then, the plan selection unit 15 selects the control plan Cy corresponding to the weather change pattern Py.

A process of step S303 is the same as that of Embodiment 1, and accordingly its description will be omitted.

As described above, in this embodiment, the plan formulation unit 14 formulates the plurality of control plans C1 to Cn in accordance with the target value of the power consumption of the air conditioner 54 in a time zone T. The plan formulation unit 14 stores the plurality of control plans C1 to Cn to the data storage unit 20. Unlike in Embodiment 1, when selecting the weather change pattern Py, the plan selection unit 15 specifies, from among the plurality of control plans C1 to Cn, a control plan according to which a prediction value of power consumption of the air conditioner 54 during the rest of the time zone T exceeds a difference between the target value and the actual value of power consumption of the air conditioner 54 of up to the time point Tm. The plan selection unit 15 excludes a weather change pattern corresponding to the specified control plan from candidates.

Description of Effect of Embodiment

According to this embodiment, the air conditioner 54 can be controlled such that even if the control plan for the air conditioner 54 is modified, the power consumption stays within a target range planned before modification of the control plan.

\*\*\*Other Configuration\*\*\*

In this embodiment, the functions of the pattern extraction unit 11, heat load prediction unit 12, target value input unit 13, plan formulation unit 14, plan selection unit 15, and actual value acquisition unit 16 are implemented by software, as in Embodiment 1. Alternatively, the functions of the pattern extraction unit 11, heat load prediction unit 12, target value input unit 13, plan formulation unit 14, plan selection unit 15, and actual value acquisition unit 16 may be implemented by a combination of software and hardware, as in the modification of Embodiment 1.

Embodiment 3

Figure 10:
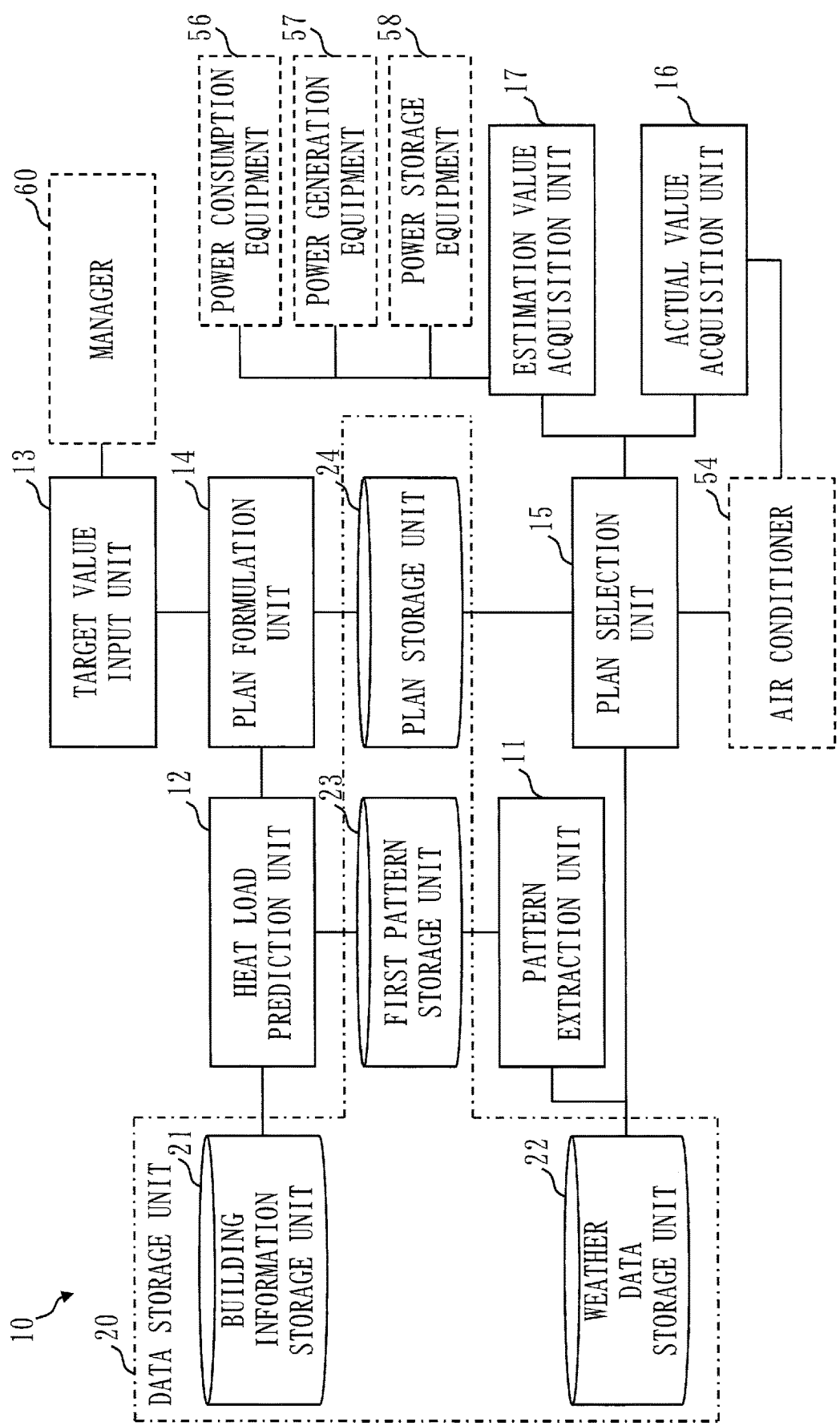
FIG. 10 is a block diagram illustrating a functional configuration of an operation control device according to Embodiment 3.

This embodiment will be described referring to FIG. 10 mainly regarding differences from Embodiment 1.

\*\*\*Description of Configuration\*\*\*

A configuration of an operation control device 10 according to this embodiment will be described referring to FIG. 10.

The operation control device 10 is provided with a pattern extraction unit 11, a heat load prediction unit 12, a target value input unit 13, a plan formulation unit 14, a plan selection unit 15, a data storage unit 20, and additionally an actual value acquisition unit 16 and an estimation value acquisition unit 17, as functional elements. Functions of the pattern extraction unit 11, heat load prediction unit 12, target value input unit 13, plan formulation unit 14, plan selection unit 15, actual value acquisition unit 16, and estimation value acquisition unit 17 are implemented by software.

\*\*\*Description of Operation\*\*\*

An operation of the operation control device 10 according to this embodiment will be described referring to FIG. 10.

The operation of the operation control device 10 is equivalent to an operation control method according to this embodiment.

A procedure of extracting a weather change pattern and formulating a control plan for an air conditioner 54 is the same as that of Embodiment 1 illustrated in FIG. 4, and accordingly its description will be omitted.

A procedure of starting operation control over the air conditioner 54 in this embodiment will be described regarding differences from that of Embodiment 1 illustrated in FIG. 6.

A process of step S201 is the same as that of Embodiment 1, and accordingly its description will be omitted.

At a time point T1 at which operation control over the air conditioner 54 is started, the estimation value acquisition unit 17 acquires an estimated value of extra power generated during a specific period by at least one of power saving, power generation, and power storage performed by another equipment in a building where the air conditioner 54 is installed. Note that "another equipment" refers to some or all of: power consumption equipment 56 such as lighting equipment, an elevator, water supply and drainage equipment, heat source equipment, heat transfer equipment, and ventilation equipment that consume power; power generation equipment 57 such as solar power generation equipment and wind power generation equipment; and power storage equipment 58 such as an accumulator battery, a fuel cell, and an electric automobile. The extra power generated by "power saving" refers to power that becomes available to the air conditioner 54 when the power consumption of the power consumption equipment 56 is reduced by suspension of operation or energy saving operation of the power consumption equipment 56. The extra power generated by "power generation" refers to power that becomes available to the air conditioner 54 when power generated by the power generation equipment 57 is supplied from the power generation equipment 57. The extra power generated by "power storage" refers to power that becomes available to the air conditioner 54 when power stored in the power storage equipment 58 is supplied from the power storage equipment 58.

In step S202, the plan selection unit 15 refers to the estimated value of the extra power acquired by the estimation value acquisition unit 17 and selects, from among control plans C1 to Cn stored in the plan storage unit 24, a control plan Cy that may allow achieving a target value of the power consumption and a target value of an indoor comfort degree in a specific period. More specifically, the plan selection unit 15 adds the estimated value of the extra power acquired by the estimation value acquisition unit 17 to the target value of the total power consumption amount from the time point T1 to a time point T2 at which operation control over the air conditioner 54 ends. The addition result corresponds to a power amount that can be used from the time point T1 to the time point T2. The plan selection unit 15 calculates a prediction value of the power consumption from the time point T1 to the time point T2, for each of the control plans C1 to Cn. The plan selection unit 15 determines whether the calculated prediction value exceeds the power amount that can be used from the time point T1 to the time point T2, for each of the control plans C1 to Cn. The plan selection unit 15 selects a weather change pattern Px the closest to a weather change pattern predicted in step S201, from among weather change patterns corresponding to control plans whose prediction values are equal to or less than the usable power amount. Then, the plan selection unit 15 selects a control plan Cx corresponding to the weather change pattern Px.

A process of step S303 is the same as that of Embodiment 1, and accordingly its description will be omitted.

A procedure of modifying the control plan for the air conditioner 54 in this embodiment will be described regarding differences from the procedure in Embodiment 1 illustrated in FIG. 8.

A process of step S301 is the same as that of Embodiment 1, and accordingly its description will be omitted.

At the time point Tm at which it is determined whether or not to the control plan of the air conditioner 54 needs modification, the actual value acquisition unit 16 acquires an actual value of power consumption from the time point T1 to a time point Tm of the air conditioner 54, and actual values of power consumption, generated power, and stored power from the time point T1 to the time point Tm of another equipment.

At the time point Tm, the estimation value acquisition unit 17 acquires an estimated value of extra power generated by at least one of power saving, power generation, and power storage from the time point Tm to the time point T2 by another equipment.

In step S302, the plan selection unit 15 refers to the actual values of power consumption, generated power, and stored power which are acquired by the actual value acquisition unit 16 and an estimated value of extra power acquired by the estimation value acquisition unit 17 and selects, from among the control plans C1 to Cn stored in the plan storage unit 24, the control plan Cy that may allow achieving the target values of the power consumption and indoor comfort degree throughout a specific period. More specifically, the plan selection unit 15 calculates an actual value of an extra power from the time point T1 to the time point Tm from the actual values of the power consumption, generated power, and stored power of another equipment which are acquired by the actual value acquisition unit 16. The plan selection unit 15 subtracts the actual value of the power consumption, acquired by the actual value acquisition unit 16, of the air conditioner 54 from the sum of the calculated actual value of the extra power, the target value of the total power consumption amount from the time point T1 to the time point T2, and the estimated value, acquired by the estimation value acquisition unit 17, of the power consumption. The subtraction result corresponds to a power amount that can be used from the time point Tm to the time point T2. The plan selection unit 15 calculates a prediction value of the power consumption from the time point Tm to the time point T2, for each of the control plans C1 to Cn. The plan selection unit 15 determines whether the calculated prediction value exceeds the power amount that can be used from the time point Tm to the time point T2, for each of the control plans C1 to Cn. The plan selection unit 15 selects the weather change pattern Py the closest to the weather change pattern Pm predicted in step S301, from among weather change patterns corresponding to control plans whose prediction values are equal to or less than the usable power amount. Then, the plan selection unit 15 selects the control plan Cy corresponding to the weather change pattern Py.

A process of step S303 is the same as that of Embodiment 1, and accordingly its description will be omitted.

As described above, in this embodiment, unlike in Embodiment 1, when selecting the weather change pattern Py, the plan selection unit 15 specifies, from among the plurality of control plans C1 to Cn, a control plan according to which a prediction value of power consumption of the air conditioner 54 during the rest of the time zone T exceeds an estimated value of extra power generated during the rest of the time zone T by at least one of suspension of operation or energy saving operation of the power consumption equipment 56 other than the air conditioner 54, power supply from the power generation equipment 57, and power supply from the power storage equipment 58. The plan selection unit 15 excludes a weather change pattern corresponding to the specified control plan from candidates.

Description of Effect of Embodiment

According to this embodiment, it is possible to determine how much power the air conditioner 54 may consume during a specific period while taking into consideration the extra power generated by at least one of power saving, power generation, and power storage performed by another equipment in the building where the air conditioner 54 is installed. It is also possible to select or modify the control plan for the air conditioner 54 based on the determination result so that the target value of the power consumption is achieved.

\*\*\*Other Configuration\*\*\*

In this embodiment, the functions of the pattern extraction unit 11, heat load prediction unit 12, target value input unit 13, plan formulation unit 14, plan selection unit 15, actual value acquisition unit 16, and estimation value acquisition unit 17 are implemented by software, as in Embodiment 1. Alternatively, the functions of the pattern extraction unit 11, heat load prediction unit 12, target value input unit 13, plan formulation unit 14, plan selection unit 15, actual value acquisition unit 16, and estimation value acquisition unit 17 may be implemented by a combination of software and hardware, as in the modification of Embodiment 1.

Embodiment 4

Figure 11:
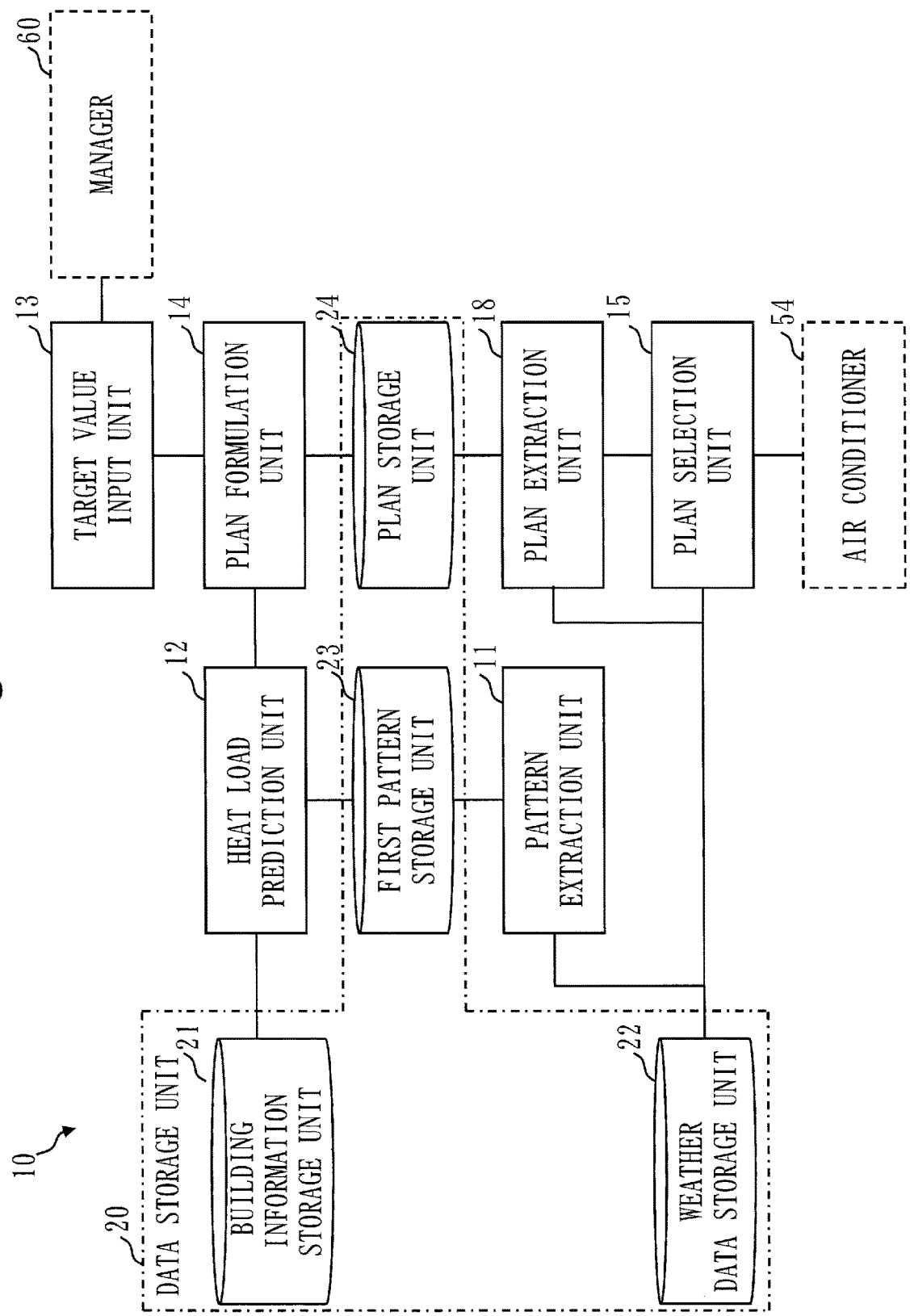
FIG. 11 is a block diagram illustrating a functional configuration of an operation control device according to Embodiment 4.

This embodiment will be described referring to FIG. 11 mainly regarding differences from Embodiment 1.

\*\*\*Description of Configuration\*\*\*

A configuration of an operation control device 10 according to this embodiment will be described referring to FIG. 11.

The operation control device 10 is provided with a pattern extraction unit 11, a heat load prediction unit 12, a target value input unit 13, a plan formulation unit 14, a plan selection unit 15, a data storage unit 20, and additionally a plan extraction unit 18, as functional elements. Functions of the pattern extraction unit 11, heat load prediction unit 12, target value input unit 13, plan formulation unit 14, plan selection unit 15, and plan extraction unit 18 are implemented by software.

The plan extraction unit 18 is located between the plan selection unit 15 and a plan storage unit 24.

\*\*\*Description of Operation\*\*\*

An operation of the operation control device 10 according to this embodiment will be described referring to FIG. 11. The operation of the operation control device 10 is equivalent to an operation control method according to this embodiment.

A procedure of extracting a weather change pattern and formulating a control plan for an air conditioner 54 is the same as that of Embodiment 1 illustrated in FIG. 4, and accordingly its description will be omitted.

A procedure of starting operation control over the air conditioner 54 in this embodiment will be described regarding differences from that of Embodiment 1 illustrated in FIG. 6.

A process of step S201 is the same as that of Embodiment 1, and accordingly its description will be omitted.

At a time point T1 at which operation control over the air conditioner 54 is started, the plan extraction unit 18 acquires an actual value representing a weather change pattern of up to the time point T1 from a weather data storage unit 22. The plan extraction unit 18 extracts control plans from among control plans C1 to Cn stored in the plan storage unit 24, excluding a control plan formulated based on a weather change pattern completely different from the actual value representing the weather change pattern of up to the time point T1. The plan extraction unit 18 hands only the extracted control plans to the plan selection unit 15.

In step S202, the plan selection unit 15 selects a weather change pattern Px the closest to the weather change pattern predicated in step S201 from among weather change patterns corresponding to the control plans extracted by the plan extraction unit 18. Then, the plan selection unit 15 selects a control plan Cx corresponding to the weather change pattern Px.

A process of S203 is the same as that of Embodiment 1, and accordingly its description will be omitted.

A procedure of modifying the control plan for the air conditioner 54 in this embodiment will be described regarding differences from that of Embodiment 1 illustrated in FIG. 8.

A process of step S301 is the same as that of Embodiment 1, and accordingly its description will be omitted.

At a time point Tm at which it is determined whether nor not the control plan for the air conditioner 54 needs modification, the plan extraction unit 18 acquires an actual value representing the weather change pattern Pm of up to the time point Tm from the weather data storage unit 22. The plan extraction unit 18 extracts control plans from among the control plans C1 to Cn stored in the plan storage unit 24, excluding a control plan formulated based on a weather change pattern completely different from the actual value representing a weather change pattern Pm of up to the time point T1. The plan extraction unit 18 hands only the extracted control plans to the plan selection unit 15.

In step S302, the plan selection unit 15 selects a weather change pattern Py the closest to the weather change pattern Pm extracted in step S301 from among weather change patterns corresponding to the control plans extracted by the plan extraction unit 18. Then, the plan selection unit 15 selects a control plan Cy corresponding to the weather change pattern Py.

A process of S303 is the same as that of Embodiment 1, and its description will accordingly be omitted.

As described above, in this embodiment, the plan extraction unit 18 extracts, from among a plurality of weather change patterns P1 to Pn, a weather change pattern deviating from the actual weather change pattern, based on a weather observation result of before a time zone T. Unlike in Embodiment 1, the plan selection unit 15 selects one weather change pattern Px other than the weather change pattern extracted by the plan extraction unit 18, from among the plurality of weather change patterns P1 to Pn stored in the data storage unit 20. As in Embodiment 1, during the time zone T, the plan selection unit 15 controls the operation of the air conditioner 54 along the control plan Cx corresponding to the weather change pattern Px, among the plurality of control plans C1 to Cn.

Description of Effect of Embodiment

According to this embodiment, candidates to choose from for the plan selection unit 15 when selecting the control plan for the air conditioner 54 can be reduced. Therefore, the control plan for the air conditioner 54 can be selected more rapidly.

\*\*\*Other Configuration\*\*\*

In this embodiment, the functions of the pattern extraction unit 11, heat load prediction unit 12, target value input unit 13, plan formulation unit 14, plan selection unit 15, and plan extraction unit 18 are implemented by software, as in Embodiment 1. Alternatively, the functions of the pattern extraction unit 11, heat load prediction unit 12, target value input unit 13, plan formulation unit 14, plan selection unit 15, and plan extraction unit 18 may be implemented by a combination of software and hardware, as in the modification of Embodiment 1.

Embodiment 5

Figure 12:
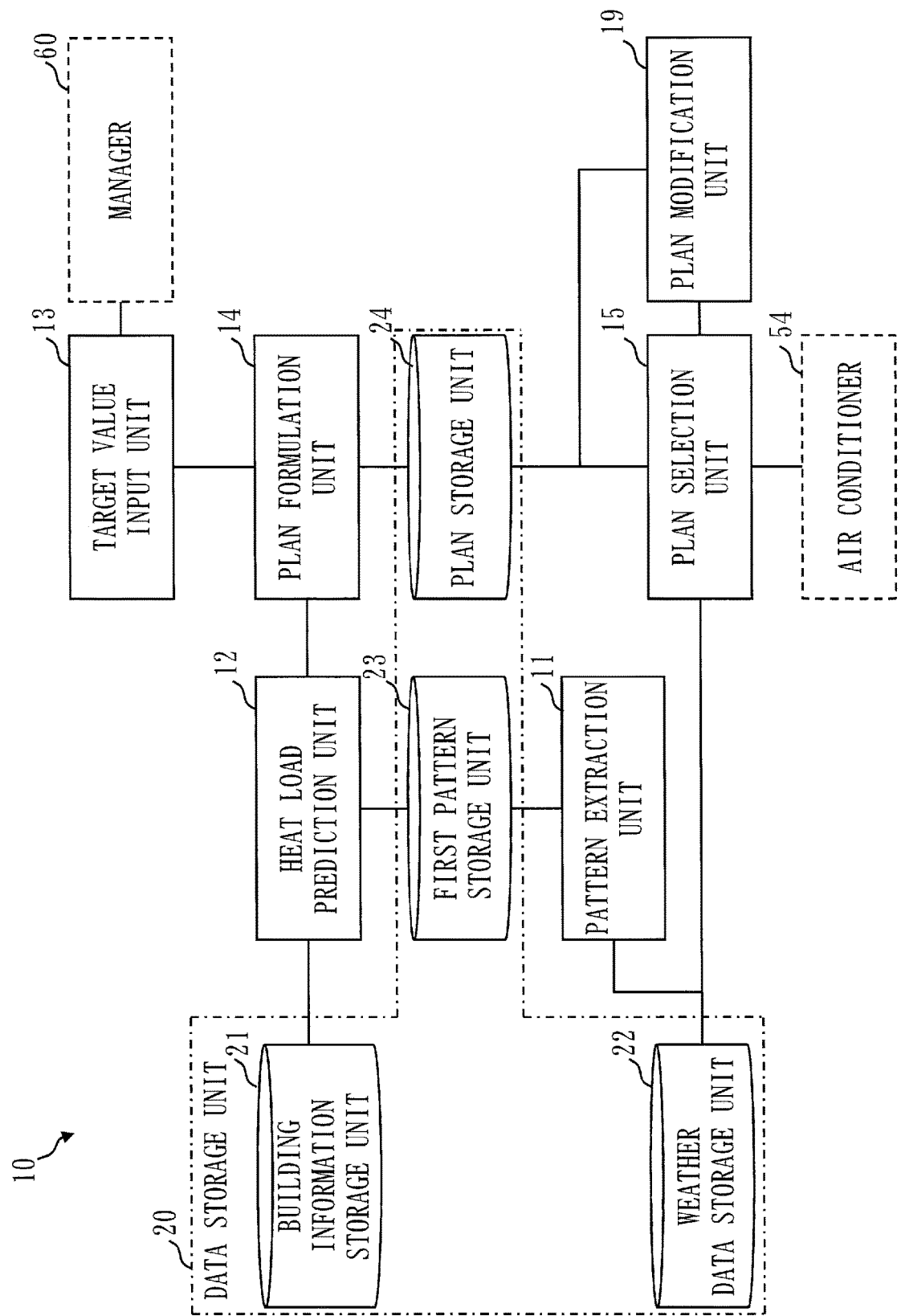
FIG. 12 is a block diagram illustrating a functional configuration of an operation control device according to Embodiment 5.

This embodiment will be described referring to FIG. 12 mainly regarding differences from Embodiment 1.

\*\*\*Description of Configuration\*\*\*

A configuration of an operation control device 10 according to this embodiment will be described referring to FIG. 12.

The operation control device 10 is provided with a pattern extraction unit 11, a heat load prediction unit 12, a target value input unit 13, a plan formulation unit 14, a plan selection unit 15, a data storage unit 20, and additionally a plan modification unit 19, as functional elements. Functions of the pattern extraction unit 11, heat load prediction unit 12, target value input unit 13, plan formulation unit 14, plan selection unit 15, and plan modification unit 19 are implemented by software.

The plan modification unit 19 is located side by side with the plan selection unit 15.

In Embodiment 1, when modifying the control plan for the air conditioner 54, the control plan Cy formulated based on the weather change pattern Py similar to the actual value representing the weather change pattern Pm of up to that time point is selected as a new control plan. However, in cases where a weather change pattern Py similar to the actual value representing the weather change pattern Pm of up to that time point does not exist, even if the control plan for the air conditioner 54 is modified, the power consumption and indoor comfort degree as targets cannot be achieved. In view of this, according to this embodiment, when modifying the control plan for the air conditioner 54, a weather change pattern of a specific period is newly calculated based on the actual value representing a weather change pattern Pm of up to that time point. Then, the already formulated control plan for the air conditioner 54 is modified based on the newly calculated weather change pattern.

\*\*\*Description of Operation\*\*\*

An operation of the operation control device 10 according to this embodiment will be described referring to FIG. 12. The operation of the operation control device 10 is equivalent to an operation control method according to this embodiment.

A procedure of extracting a weather change pattern and formulating a control plan for an air conditioner 54 is the same as that of Embodiment 1 illustrated in FIG. 4, and accordingly its description will be omitted.

A procedure of starting operation control over the air conditioner 54 is also the same as that of Embodiment 1 illustrated in FIG. 6, and accordingly its description will be omitted.

A procedure of modifying the control plan for the air conditioner 54 in this embodiment will be described regarding differences from that of Embodiment 1 illustrated in FIG. 8.

A process of step S301 is the same as that of Embodiment 1, and accordingly its description will be omitted.

At a time point Tm at which it is determined whether or not the control plan for the air conditioner 54 needs modification, the plan modification unit 19 acquires an actual value representing a weather change pattern Pm of up to the time point Tm from a weather data storage unit 22. In cases where a control plan formulated based on a weather change pattern similar to the actual value representing a weather change pattern of up to the time point Tm does not exist among the control plans C1 to Cn stored in a plan storage unit 24, the plan modification unit 19 modifies one of the already formulated control plans. More specifically, the plan modification unit 19 predicts weather fluctuations from the time point Tm to the time point T2 based on the actual value representing the weather change pattern Pm. The plan modification unit 19 newly calculates a weather change pattern in a specific period in accordance with the actual value representing the weather change pattern Pm and the prediction values of the weather fluctuations. The plan modification unit 19 selects an arbitrary one of the control plans C1 to Cn stored in the plan storage unit 24. The plan modification unit 19 estimates how power consumption and indoor comfort degree in the selected control plan change according to the newly calculated weather change pattern. Based on the estimation result, the plan modification unit 19 alters part of the selected control plan so that the power consumption and indoor comfort degree as targets can be achieved. For example, the plan modification unit 19 changes a preset temperature in some period of the air conditioner 54.

A process of step S303 is the same as that of Embodiment 1, and accordingly its description will be omitted.

As described above, in this embodiment, in cases where every one of the plurality of weather change patterns stored in the data storage unit 20 deviates from the actual weather change pattern, the plan modification unit 19 predicts weather fluctuations during the rest of the time zone T based on the weather data. The plan modification unit 19 calculates a new weather change pattern in accordance with the prediction result. The plan modification unit 19 modifies an arbitrary control plan among the plurality of control plans C1 to Cn in accordance with the calculated weather change pattern. During the rest of the time zone T, the plan selection unit 15 controls the operation of the air conditioner 54 along the control plan modified by the plan modification unit 19.

Instead of modifying the control plan by changing part of the existing control plan, the plan modification unit 19 may predict heat load from a newly calculated weather change pattern, as in step S102, and may re-formulate a control plan that achieves the power consumption and power indoor comfort degree as targets, as in step S103.

Description of Effect of Embodiment

According to this embodiment, when modifying the control plan of the air conditioner 54, not only a scheme of selecting a control plan again but also a scheme of modifying a control plan itself may be employed. Therefore, it is possible to flexibly deal with a case where a weather change pattern not similar to any one of weather change patterns prepared in advance occurs.

*Other Configuration*

In this embodiment, the functions of the pattern extraction unit 11, heat load prediction unit 12, target value input unit 13, plan formulation unit 14, plan selection unit 15, and plan modification unit 19 are implemented by software, as in Embodiment 1. Alternatively, the functions of the pattern extraction unit 11, heat load prediction unit 12, target value input unit 13, plan formulation unit 14, plan selection unit 15, and plan modification unit 19 may be implemented by a combination of software and hardware, as in the modification of Embodiment 1.

Embodiment 6

Figure 13:
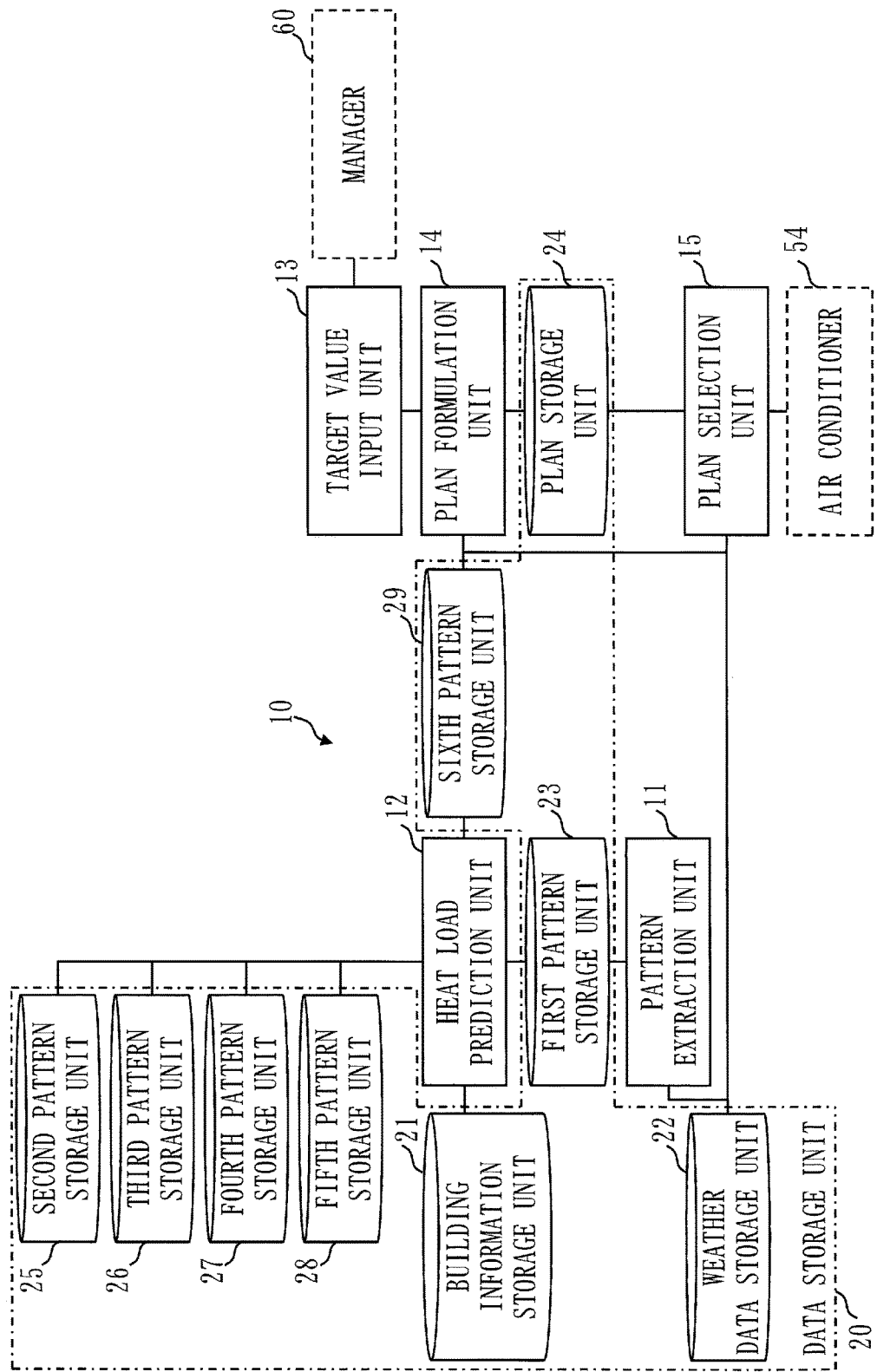
FIG. 13 is a block diagram illustrating a functional configuration of an operation control device according to Embodiment 6.

This embodiment will be described referring to FIG. 13 mainly regarding differences from Embodiment 1.

*Description of Configuration*

A configuration of an operation control device 10 according to this embodiment will be described referring to FIG. 13.

In Embodiment 1, when an air conditioning load fluctuates from a prediction due to the weather conditions, the control plan for the air conditioner 54 is modified. However, fluctuations in air conditioning load depend not only on the weather conditions but also on another factor such as a ventilation temperature and facility usage status. In view of this, in this embodiment, not only a large number of weather change patterns but also a large number of heat load fluctuation patterns caused by a factor such as an illumination usage, a human occupancy, an apparatus usage, and a ventilation quantity which influence the heat load are extracted. By formulating control plans corresponding to individual heat load fluctuation patterns, even when fluctuations are caused by a factor other than the weather conditions, the control plan can be modified to deal with the fluctuations.

A data storage unit 20 has a building information storage unit 21, a weather data storage unit 22, a first pattern storage unit 23, a plan storage unit 24, and additionally a second pattern storage unit 25, a third pattern storage unit 26, a fourth pattern storage unit 27, a fifth pattern storage unit 28, and a sixth pattern storage unit 29.

The second pattern storage unit 25, third pattern storage unit 26, fourth pattern storage unit 27, and fifth pattern storage unit 28 store a plurality of subject change patterns as a pattern of how a subject different from the weather changes to serve as a factor that changes the heat load of the air conditioner 54.

More specifically, the second pattern storage unit 25 stores illumination usage patterns as the plurality of subject change patterns. The illumination usage pattern is a pattern of how the usage status of the illumination equipment in each room 55 changes. The illumination usage pattern can be obtained from a scheduler 52, or an entry and exit management controller or card reader (not shown).

The third pattern storage unit 26 stores human occupancy patterns as the plurality of subject change patterns. The human occupancy pattern is a pattern of how a probability of presence of at least one person in each room 55 changes. The human occupancy pattern can be obtained from the scheduler 52, or the entry and exit management controller or card reader (not shown).

The fourth pattern storage unit 27 stores apparatus usage patterns as the plurality of subject change patterns. The apparatus usage pattern is a pattern of how the usage status of each one of various apparatuses in the building changes. The apparatus usage pattern can be obtained from each one of various apparatuses in the building.

The fifth pattern storage unit 28 stores ventilation amount patterns as the plurality of subject change patterns. The ventilation amount pattern is a pattern of how the ventilation amount of each room 55 changes. The ventilation amount pattern can be obtained from the air conditioning controller 53.

The sixth pattern storage unit 29 stores a plurality of heat load fluctuation patterns predicated in accordance with the plurality of subject change patterns stored in each of the second pattern storage unit 25, third pattern storage unit 26, fourth pattern storage unit 27, and fifth pattern storage unit 28.

The plan storage unit 24 stores a plurality of control plans as a plan for controlling the operation of the air conditioner 54 in accordance with respective combinations of the plurality of weather change patterns and the plurality of subject change patterns. In this embodiment, the plurality of control plans are individually formulated in practice in accordance with the plurality of heat load fluctuation patterns stored in the sixth pattern storage unit 29. Alternatively, the plurality of control plans may be individually formulated in accordance with the respective combinations of the plurality of weather change patterns and the plurality of subject change patterns. That is, instead of formulating one control plan for one heat load fluctuation pattern, one control plan may be formulated for one combination of a weather change pattern and a subject change pattern.

*Description of Operation*

An operation of the operation control device 10 according to this embodiment will be described referring to FIG. 13. The operation of the operation control device 10 is equivalent to an operation control method according to this embodiment.

A procedure of extracting a weather change pattern and formulating a control plan for an air conditioner 54 in this embodiment will be described regarding differences from that of Embodiment 1 illustrated in FIG. 4.

A process of step S101 is the same as that of Embodiment 1, and accordingly its description will be omitted.

In step S102, a heat load prediction unit 12 predicts a large number of heat load fluctuation patterns from among combinations of various patterns of a specific period which are stored in the first pattern storage unit 23, second pattern storage unit 25, third pattern storage unit 26, fourth pattern storage unit 27, and fifth pattern storage unit 28. The heat load prediction unit 12 stores the predicted heat load fluctuation patterns to the sixth pattern storage unit 29.

In step S103, a plan formulation unit 14 formulates, for each of all heat load fluctuation patterns stored in the sixth pattern storage unit 29, a control plan for the air conditioner 54 to satisfy a target value of a designated power consumption and a target value of a designated indoor comfort degree. The plan formulation unit 14 stores sets of the heat load fluctuation patterns and formulated control plans to the plan storage unit 24.

A procedure of starting operation control over the air conditioner 54 in this embodiment will be described regarding differences from that of Embodiment 1 illustrated in FIG. 6.

At a time point T1 at which operation control over the air conditioner 54 is started, a plan selection unit 15 selects an appropriate heat load fluctuation pattern predicated from a plan for a specific period of the illumination usage, human occupancy, apparatus usage, and ventilation quantity, and a control plan Cx corresponding to the heat load fluctuation pattern, from the plan storage unit 24. The plan selection unit 15 controls operation of the air conditioner 54 based on the selected control plan Cx.

A procedure of modifying the control plan for the air conditioner 54 in this embodiment will be described regarding differences from that of Embodiment 1 illustrated in FIG. 8.

At a time point Tm at which it is determined whether or not the control plan of the air conditioner 54 needs modification, the plan selection unit 15 selects a heat load fluctuation pattern similar to a heat load fluctuation pattern of up to the time point Tm and a control plan Cy corresponding to that heat load fluctuation pattern, from the plan storage unit 24 appropriately. The plan selection unit 15 controls operation of the air conditioner 54 based on the selected control plan Cy.

The processing described above is practiced at the time of formulating the control plan for the air conditioner 54, at the time of starting control over the air conditioner 54, and at the time of modifying the control plan for the air conditioner 54.

As described above, in this embodiment, at the time point Tm, if the subject change pattern corresponding to the control plan Cx deviates from the actual subject change pattern, then in the rest of a time zone T, the plan selection unit 15 controls the operation of the air conditioner 54 along a control plan corresponding to a subject change pattern that is different from the subject change pattern corresponding to the control plan Cx, among a plurality of control plans C1 to Cn.

In this embodiment, when the heat load fluctuates, the control plan for the air conditioner 54 is modified through comparison with the heat load fluctuation pattern which is stored in the sixth pattern storage unit 29 in advance. Alternatively, the control plan for the air conditioner 54 may be modified through comparison of individual heat load factor. For example, when only the human occupancy fluctuates, the control plan may be selected through comparison with a human occupancy pattern which is stored in the third pattern storage unit 26 in advance.

In this embodiment, the illumination usage, human occupancy, apparatus usage, and ventilation quantity are discussed as factors that fluctuate the air conditioning load. Note that there are many other fluctuation factors. For example, if a human condition changes, an optimal temperature changes. As the optimal temperature changes, an appropriate indoor comfort degree as well as a preset temperature and heat load of the air conditioner 54 fluctuate accordingly. Therefore, the control plan for the air conditioner 54 may be modified by taking into consideration a fluctuation pattern due to a heat load fluctuation factor other than the factors discussed in this embodiment.

Description of Effect of Embodiment

According to this embodiment, during operation control over the air conditioner 54, if an air conditioning load fluctuates from a prediction due to a factor other than weather conditions, a control plan can be selected again from among a large number of control plans formulated in advance, in accordance with the fluctuations of the air conditioning load. Therefore, the calculation cost can be suppressed. Since modification of the control plan does not take much time, the control plan can be modified before the error grows. As a result, it is possible to keep controlling the air conditioner 54 while maintaining power consumption and indoor comfort degree that are close to the planned values given as the targets.

REFERENCE SIGNS LIST

10: operation control device; 11: pattern extraction unit; 12: heat load prediction unit; 13: target value input unit; 14: plan formulation unit; 15: plan selection unit; 16: actual value acquisition unit; 17: estimation value acquisition unit; 18: plan extraction unit; 19: plan modification unit; 20: data storage unit; 21: building information storage unit; 22: weather data storage unit; 23: first pattern storage unit; 24: plan storage unit; 25: second pattern storage unit; 26: third pattern storage unit; 27: fourth pattern storage unit; 28: fifth pattern storage unit; 29: sixth pattern storage unit; 31: processor; 32: ROM; 33: memory; 34: auxiliary storage device; 35: mouse; 36: keyboard; 37: display; 38: input/output controller; 39: network controller; 40: internal bus; 50: air conditioning system; 51: LAN; 52: scheduler; 53: air conditioning controller; 54: air conditioner; 55: room; 56: power consumption equipment; 57: power generation equipment; 58: power storage equipment; 60: manager

The invention claimed is:

1. An operation control device comprising:
a memory to store a plurality of weather change patterns as a pattern of how weather changes, and store a plurality of control plans as a plan for controlling an operation of an air conditioning equipment in accordance with the plurality of weather change patterns, respectively; and
processing circuitry to
determine, at a time point midway through a time zone where the operation of the air conditioning equipment is controlled along one control plan among the plurality of control plans stored in the memory, whether a weather change pattern corresponding to the one control plan deviates from an actual weather change pattern, based on weather data indicating a time-series weather observation result of up to the time point; if deviates, select a weather change pattern that is different from the weather change pattern corresponding to the one control plan, from among the plurality of weather change patterns stored in the memory, in accordance with the weather data; and during a rest of the time zone, control the operation of the air conditioning equipment along a control plan corresponding to the different weather change pattern, among the plurality of control plans; and
to formulate the plurality of control plans in accordance with a target value of power consumption of the air conditioning equipment in the time zone, and store the plurality of control plans to the memory,
wherein the processing circuitry, when selecting the different weather change pattern, specifies, from among the plurality of control plans, a control plan according to which a prediction value of power consumption of the air conditioning equipment during the rest of the time zone exceeds a difference between the target value and an actual value of power consumption of the air conditioning equipment of up to the time point, and excludes a weather change pattern corresponding to the specified control plan from candidates.

2. The operation control device according to claim 1, wherein the processing circuitry, when selecting the different weather change pattern, specifies, from among the plurality of control plans, a control plan according to which a prediction value of power consumption of the air conditioning equipment during the rest of the time zone exceeds an estimated value of extra power generated during the rest of the time zone by at least one of suspension of operation or energy saving operation of a power consumption equipment other than the air conditioning equipment, power supply from a power generation equipment, and power supply from power storage equipment, and excludes a weather change pattern corresponding to the specified control plan from candidates.

3. The operation control device according to claim 1, wherein the processing circuitry
extracts, from among the plurality of weather change patterns, a weather change pattern deviating from the actual weather change pattern, based on a weather observation result of before the time zone, and
selects one weather change pattern other than the extracted weather change pattern, from among the plurality of weather change patterns stored in the memory, and during the time zone, controls the operation of the air conditioning equipment along a control plan corresponding to the one weather change pattern, among the plurality of control plans.

4. The operation control device according to claim 1, wherein the processing circuitry
predicts weather fluctuations during the rest of the time zone, in cases where every one of the plurality of weather change patterns stored in the memory deviates from the actual weather change pattern, based on the weather data, calculates a new weather change pattern in accordance with a prediction result, and modifies an arbitrary control plan among the plurality of control plans in accordance with the calculated weather change pattern, and
during the rest of the time zone, controls the operation of the air conditioning equipment along the modified control plan.

5. The operation control device according to claim 1, wherein the memory further stores a plurality of subject change patterns as a pattern of how a subject different from the weather changes to serve as a factor that changes a heat load of the air conditioning equipment, and stores the plurality of control plans as a plan for controlling the operation of the air conditioning equipment in accordance with respective combinations of the plurality of weather change patterns and the plurality of subject change patterns, and
wherein at the time point, if the subject change pattern corresponding the one control plan deviates from the actual subject change pattern, then in the rest of the time zone, the processing circuitry controls the operation of the air conditioning equipment along a control plan corresponding to a subject change pattern that is different from the subject change pattern corresponding to the one control plan, among the plurality of control plans.

6. An air conditioning system comprising:
the operation control device according to claim 1; and
the air conditioning equipment whose operation is controlled by the operation control device.

7. An operation control method in which a computer, comprising a memory to store a plurality of weather change patterns as a pattern of how weather changes, and store a plurality of control plans as a plan for controlling an operation of an air conditioning equipment in accordance with the plurality of weather patterns, respectively,
determines, at a time point midway through a time zone where the operation of the air conditioning equipment is controlled along one control plan among the plurality of control plans stored in the memory, whether a weather change pattern corresponding to the one control plan deviates from an actual weather change pattern, based on weather data indicating a time-series weather observation result of up to the time point; if deviates, selects a weather change pattern that is different from the weather change pattern corresponding to the one control plan, from among the plurality of weather change patterns stored in the memory, in accordance with the weather data; and during a rest of the time zone, controls the operation of the air conditioning equipment along a control plan corresponding to the different weather change pattern, among the plurality of control plans,
formulates the plurality of control plans in accordance with a target value of power consumption of the air conditioning equipment in the time zone, and stores the plurality of control plans to the memory, and
when selecting the different weather change pattern, specifies, from among the plurality of control plans, a control plan according to which a prediction value of power consumption of the air conditioning equipment during the rest of the time zone exceeds a difference between the target value and an actual value of power consumption of the air conditioning equipment of up to the time point, and excludes a weather change pattern corresponding to the specified control plan from candidates.

8. A non-transitory computer readable medium storing an operation control program which causes a computer, comprising a memory to store a plurality of weather change patterns as a pattern of how weather changes, and store a plurality of control plans as a plan for controlling an operation of an air conditioning equipment in accordance with the plurality of weather patterns, respectively,
to execute a process of: determining, at a time point midway through a time zone where the operation of the air conditioning equipment is controlled along one control plan among the plurality of control plans stored in the memory, whether a weather change pattern corresponding to the one control plan deviates from an actual weather change pattern, based on weather data indicating a time-series weather observation result of up to the time point; if deviates, selecting a weather change pattern that is different from the weather change pattern corresponding to the one control plan, from among the plurality of weather change patterns stored in the memory, in accordance with the weather data; and during a rest of the time zone, controlling the operation of the air conditioning equipment along a control plan corresponding to the different weather change pattern, among the plurality of control plans, and
a process of formulating the plurality of control plans in accordance with a target value of power consumption of the air conditioning equipment in the time zone, and storing the plurality of control plans to the memory,
wherein the process of controlling the operation of the air conditioning equipment, when selecting the different weather change pattern, specifies, from among the plurality of control plans, a control plan according to which a prediction value of power consumption of the air conditioning equipment during the rest of the time zone exceeds a difference between the target value and an actual value of power consumption of the air conditioning equipment of up to the time point, and excludes a weather change pattern corresponding to the specified control plan from candidates.

9. An air conditioning system comprising:
   the operation control device according to claim 2; and
   the air conditioning equipment whose operation is controlled by the operation control device.

10. An air conditioning system comprising:
    the operation control device according to claim 3; and
    the air conditioning equipment whose operation is controlled by the operation control device.

11. An air conditioning system comprising:
    the operation control device according to claim 4; and
    the air conditioning equipment whose operation is controlled by the operation control device.

12. An air conditioning system comprising:
    the operation control device according to claim 5; and
    the air conditioning equipment whose operation is controlled by the operation control device.

* * * * *